US006531261B1

(12) United States Patent
Usami et al.

(10) Patent No.: US 6,531,261 B1
(45) Date of Patent: Mar. 11, 2003

(54) PREPARATION OF OPTICAL INFORMATION RECORDING DISC AND DYE SOLUTION

(75) Inventors: Yoshihisa Usami, Odawara (JP); Yoshio Inagaki, Minami-ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/579,704

(22) Filed: May 26, 2000

(30) Foreign Application Priority Data

| May 26, 1999 | (JP) | ............ 11-146400 |
| Jun. 8, 1999 | (JP) | ............ 11-146401 |
| Jun. 8, 1999 | (JP) | ............ 11-160848 |
| Jun. 14, 1999 | (JP) | ............ 11-167304 |
| Jun. 14, 1999 | (JP) | ............ 11-167405 |

(51) Int. Cl.$^7$ .................. G11B 7/24
(52) U.S. Cl. .......... 430/270.15; 430/270.16; 430/945; 430/270.2; 430/270.21; 430/270.18; 428/64.8
(58) Field of Search .............. 430/270.15, 270.16, 430/270.18, 270.19, 270.2, 270.21, 945; 428/64.8

(56) References Cited

U.S. PATENT DOCUMENTS

| 4,364,986 A | * | 12/1982 | Zwanenburg et al. ....... 430/945 |
| 4,369,120 A | * | 1/1983 | Stelz et al. .................... 252/68 |
| 4,663,267 A | * | 5/1987 | Matsui et al. ................ 430/438 |
| 4,832,992 A | * | 5/1989 | Yabe et al. .................. 427/384 |
| 5,389,419 A | * | 2/1995 | Maeda et al. .......... 430/270.19 |
| 5,858,613 A | * | 1/1999 | Monden et al. ........ 430/270.16 |
| 6,020,105 A | * | 2/2000 | Wariishi ................ 430/270.19 |

FOREIGN PATENT DOCUMENTS

| EP | 0833314 | * | 4/1998 | ............ 430/270.18 |
| EP | 0860820 | * | 8/1998 | ............ 430/270.19 |
| JP | 09/274732 | * | 10/1997 | ............ 430/270.16 |

OTHER PUBLICATIONS

Chang, Richard, "Chemistry" McGraw–Hill, Inc. pp. 512–513. (1991).*

The Merck Index, Tenth Edition, p. 151, citation 1063, benzene, 1983.*

* cited by examiner

Primary Examiner—Martin Angebranndt
(74) Attorney, Agent, or Firm—Sughrue Mion, PLLC

(57) ABSTRACT

An optical information recording disc showing good recording characteristics is prepared by the steps of coating a dye solution of a laser light-sensitive dye in a fluorinated cyclic alkane or alkene on a transparent substrate disc and drying the coated dye solution. The fluorinated cyclic alkane or alkene can be employed in combination with other organic solvents.

20 Claims, No Drawings

PREPARATION OF OPTICAL INFORMATION RECORDING DISC AND DYE SOLUTION

FIELD OF THE INVENTION

This invention relates to an optical information recording medium such as a compact disc (namely, CD), a digital video disc (namely, DVD), a recordable compact disc (namely, CD-R) or a recordable digital video disc (namely, DVD-R).

BACKGROUND OF THE INVENTION

An optical information recording medium on which information can be only once recorded by means of a laser beam (i.e., an optical disc of write-once type) is known as a recordable compact disc (CD-R), and at present is widely used in practice. The optical disc of CD-R type generally has a multi-layered structure typically comprising a disc-shaped transparent substrate (support), a recording layer comprising an laser light-sensitive organic dye (often referred to as "recording dye layer"), a light-reflecting layer comprising a metal (hereinafter, often referred to as "metallic light-reflecting layer", or simply "reflecting layer"), and optionally a protective layer made of resin overlaid in order.

A demand for large recording capacity has recently increased, but an optical disc of CD-R type does not have satisfactorily large information-recording capacity. Therefore, an optical disc having satisfactorily large information-recording capacity has been studied and proposed. For example, a recordable DVD (i.e., recordable digital video disc, DVD-R), in which information can be recorded on and read out from by means of a laser beam having a shorter wavelength than that for CD-R, has been developed. The optical disc of DVD-R type is formed by laminating two composites having a layered structure. Each of the layered composites comprises a transparent disc substrate provided with a guide groove (i.e., pre-groove) for tracking of the laser beam, a recording layer comprising an organic dye, a light-reflecting layer, and a protective layer arranged in order. The layered composites are combined with an adhesive so that the recording layers would be placed inside. Otherwise, the optical disc of DVD-R type is formed by combining a protective disc plate and the layered composites comprising a substrate, a recording layer, a light-reflecting layer, and a protective layer arranged in order.

For writing (i.e., recording) and reading (i.e., a reproducing) the information, a CD-R is irradiated with a laser beam having a wavelength in the range of 770 to 790 nm, typically approx. 780 nm, while a DVD-R is irradiated with a laser beam of visible wavelength region (generally having a wavelength of 600 to 700 nm, typically approx. 650 nm). By the irradiation of the laser beam, the irradiated area of the recording dye layer is locally heated to change its physical or chemical characteristics. Thus, pits are formed in the irradiated area of the recording layer. Since the optical characteristics of the formed pits are different from those of the surrounding area having been not irradiated, the digital information is recorded. The recorded information can be read by a reproducing procedure generally comprising the steps of irradiating the recording layer with a relatively weak laser beam having the same wavelength as that employed in the recording procedure, and detecting the light-reflection difference between the pits and their surrounding areas.

The recording dye layer of DVD-R or CD-R is generally formed by dissolving a laser light-sensitive dye in a solvent to prepare a dye solution and coating the dye solution on a transparent substrate disc having a pre-groove on its surface by spin-coat procedure. In the spin-coat procedure, the dye solution is continuously dropped on the surface of the substrate under rotation. The dropped dye solution is centrifugally spread out, and an excessive portion of the dye solution is splashed off from the edge of the substrate. The dye solution remaining on the substrate is dried by evaporation of the solvent to form a thin recording dye layer on the substrate.

The solvent for the dye solution naturally should dissolve therein the laser light-sensitive dye at a relatively high solubility level, but essentially should not dissolve the material of the substrate. Most of the known solvents in which the dye is well soluble dissolve the surface of the substrate to damage the pre-groove. Most of the known solvents which are essentially inert to the substrate cannot dissolve the dye at a satisfactory level.

U.S. Pat. No. 4,832,992 discloses that a fluorine-coating compound is favorably employed as the solvent for the preparation of the dye solution. The fluorine-containing compound has excellent properties as a solvent for the preparation of a dye solution. For example, most laser light-sensitive dyes are well soluble in the fluorine-containing compounds while a substrate made of polycarbonate is not damaged by the fluorine-containing compounds. The U.S. Patent further discloses a representative fluorinated alcohol, namely, 2,2,3,3-tetrafluoro-1-propanol.

Thus, the fluorinated alcohol is a favorable solvent for the preparation of a dye solution to be coated on a substrate disc made of polycarbonate. However, our detailed study has revealed that it takes a relatively long time of period for evaporating the fluorinated alcohol from the dye solution coated on the substrate disc to produce a uniform thin recording dye layer. The requirement of such long time of period for drying the coated dye solution is disadvantageous for mass production of optical recording discs.

Accordingly, the present inventors have made studies to find a group of new solvents which can dissolve the laser light-sensitive dye at a relatively high level, which is essentially inert to the substrate material, particularly, polycarbonate, and which evaporates rapidly at an ambient temperature.

In the course of the studies, the inventors have tried to employ an organic solvent comprising a fluorinated cyclic alkane or alkene as a solvent for preparing a dye solution for the manufacture of a recording dye layer of an optical information recording medium.

The fluorinated hydrocarbon such as fluorinated cyclic alkane or alkene is described for the use as a detergent in Japanese Patent Provisional Publication Nos. 10-316596, 10-316597 and 10-316598. These publications further describe that a 4- to 6-membered fluorinated cyclic alkane or alkene, particularly, 1,1,2,2,3,3,4-hepta-fluorocyclopentane is preferred.

SUMMARY OF THE INVENTION

Accordingly, it is the object of the present invention to provide a laser light-sensitive dye solution which can dissolve the dye at a relatively high level, which is essentially inert to the substrate material, particularly, polycarbonate, and which evaporates rapidly at an ambient temperature.

It is another object of the invention to provide a process for the production of an optical information recording medium which is enable to produce the recording medium for a shortened drying period.

The present invention resides in a process for the preparation of an optical information recording disc comprising the steps of coating a dye solution on a transparent, substrate disc and drying the coated dye solution, in which the dye solution is a solution of a laser-light sensitive organic dye dissolved in an organic solvent comprising a fluorinated cyclic alkane or alkene.

The invention further resides in an optical information recording disc comprising a transparent substrate disc and a recording dye layer provided on the substrate disc, in which the recording dye layer is produced by the above-mentioned process.

The invention furthermore resides in a dye solution which comprises a laser-light sensitive organic dye dissolved in an organic solvent comprising a fluorinated cyclic alkane or alkene.

In the dye solution of the invention, the fluorinated cyclic alkane or alkene preferably has fluorine atoms of a number of 0.5 to 2.0 times based on the number of carbon atoms constituting its skeleton. Most preferred is 1,1,2,2,3,3,4-heptafluorocyclopentane, which is illustrated by the following formula (I).

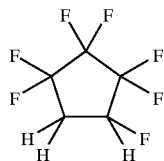

(I)

The dye solution of the present invention is preferably prepared by the steps of mixing the organic dye and the solvent and keeping the resulting mixture at a temperature of higher than 45° C. but lower than a boiling temperature of the solvent by at least 10° C. for a period of 5 minutes to 2 hours.

The solvent for the preparation of the dye solution of the invention may comprise the fluorinated cyclic alkane or alkene and one or more organic solvents or liquids. For instance, the solvent may comprise the fluorinated cyclic alkane or alkene and an organic liquid which has a boiling point higher than that of the fluorinated cyclic alkane or alkene, which is essentially inert to the substrate, and in which the dye is soluble, in a volume ratio of 99:1 to 51:49. The organic liquid preferably has a boiling point of lower than 250° C. but higher than that of the fluorinated cyclic alkane or alkene by at least 10° C. Examples of the organic liquids include an aliphatic ketone, an aliphatic hydrocarbon, an alicyclic hydrocarbon, a carboxylic acid ester, an aliphatic ether, and an alcohol. Preferred organic liquids are a fluorinated alcohols having the formulas of $CF_3CH_2OH$, $HCF_2CF_2CH_2OH$, $H(CF_2CF_2)_2CH_2OH$, and $H(CF_2CF_2)_3CH_2OH$. A keto-alcohol (e.g., diacetone alcohol) is also preferred.

The organic solvent may comprise the fluorinated cyclic alkane or alkene and an organic liquid which has a solubility for the dye higher than that of the fluorinated cyclic alkane or alkene and which is active to the substrate, in a volume ratio of 99.9:1 to 80:20. Examples of the organic liquids include a halogenated aliphatic hydrocarbon, an aromatic hydrocarbon, a ketone, a sulfoxide, an amide, a carboxylic acid ester, an ether, and a nitrile. Preferred organic liquid is a halogenated aliphatic hydrocarbon such as dichloromethane, dichloroethane, or tetrachloroethane. Acetone is also preferred.

The solvent may comprise the fluorinated cyclic alkane or alkene and a fluorinated alcohol in a volume ratio of 50:50 to 1:99. Preferred fluorinated alcohol is 2,2,3,3-tetrafluoro-1-propanol.

DETAILED DESCRIPTION OF THE INVENTION

The optical information recording disc prepared by the process of the invention has a recording dye layer formed employing the specifically selected laser light-sensitive dye solution. The recording disc may be of CD-R type and DVD-R type. In the present specification, the process of the invention is explained with respect to an optical recording disc of CD-R type as an example.

A typical optical disc of CD-R type comprises a transparent disc substrate having provided thereon a recording dye layer, a light-reflecting metal layer, and a protective resin layer overlaid in order. The process for producing an optical information recording disc comprising a transparent substrate, a recording dye layer, a light-reflecting metal layer and a protective resin layer, as an example, is described below in order.

The transparent substrate disc can be made of any of materials known as those for the producing the substrate of the known optical information recording disc. Examples of the materials include glass: polycarbonate; acrylic resins such as polymethyl methacrylate; vinyl chloride resins such as polyvinyl chloride and vinyl chloride copolymer; epoxy resins; amorphous polyolefins and polyesters. These materials can be employed in combination, if desired. The materials are molded to give a film or a rigid plate. Polycarbonate is most preferred from the viewpoints of anti-humidity, dimensional stability, and production cost.

The substrate disc may have an undercoating layer on its surface of the recording layer side, so as to enhance surface smoothness and adhesion and to keep the recording dye layer from deterioration. Examples of the material for the undercoating layer include polymers such as poly-methyl methacrylate, acrylate/methacrylate copolymer, styrene/maleic anhydride copolymer, polyvinyl alcohol, N-methylolacrylamide, styrene-vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene and polycarbonate; and surface treating agents such as a silane-coupling agent.

The undercoating layer can be formed by applying a coating solution (in which one or more of the above-mentioned materials are dissolved or dispersed) onto the surface of the substrate disc by the known coating methods such as spin-coat, dip-coat, and extrusion-coat. The undercoating layer generally has a thickness of 0.005 to 20 μm, preferably 0.01 to 10 μm.

On the surface of the substrate or on the undercoating layer, a pregroove for tracking or giving address signals is formed. The pregroove is preferably formed directly on the surface of the substrate disc when the substrate disc is molded from polymer material by injection or extrusion.

Alternatively, the pregroove can be provided on the surface of the substrate disc by placing a pregroove layer. The pregroove layer can be produced from a mixture of a monomer (such as monoester, diester, triester and tetraester) of acrylic acid (or its oligomer) and a photo-polymerization initiator. The pregroove layer can be produced by the steps of coating a precisely produced stamper with the mixture of the polymerization initiator and the monomer such as the above-mentioned acrylic ester, placing a substrate disc on the formed layer, and irradiating the formed layer with ultra-violent rays through the stamper or the substrate disc so as to cure the layer as well as to combine the cured layer and the substrate disc. The substrate disc to which the cured layer is attached is separated from the stamper, to give the desired substrate disc equipped with the pregroove layer. The thickness of the pregroove layer generally is in the range of 0.05 to 100 μm, preferably in the range of 0.1 to 50 μm.

The pregroove formed on the substrate disc preferably has a depth in the range of 0.01 to 0.3 μm and a half-width of 0.2 to 0.9 μm. A depth of 0.15 to 0.2 μm of the pregroove is preferably adopted because such pregroove can enhance the sensitivity without decreasing the light-reflection on the substrate. The optical disc having a recording dye layer formed on the deep pregroove and a light-reflection layer shows a high sensitivity, and hence is employable even in a recording system using a laser beam of low power. This means that a semiconductor laser of low output power can be employed, and the life of the semiconductor laser can be prolonged.

On the substrate provided with the pregroove, the recording dye layer is placed. The dye employed for the recording layer is not particularly restricted. Examples of the dye include cyanine dyes, phthalocyanine dyes, imidazoquinoxaline dyes, pyrylium/thiopyrylium dyes, azulenium dyes, squarilium dyes, metal (e.g., Ni, Cr) complex dyes, naphthoquinone dyes, anthraquinone dyes, indophenol dyes, merocyanine dyes, oxonol dyes, naphthoaniline dyes, triphenylmethane dyes, triallylmethane dyes, aminium/diimmonium dyes and nitroso compounds. Preferred are cyanine dyes, phthalocyanine dyes, azo dyes, azulenium dyes, squarilium dyes, oxonol dyes and imidazoquinoxaline dyes. Cyanine dyes, azo dyes and oxonol dyes are particularly preferred.

Preferably, the cyanine dyes are compounds represented by the following formula (III). The cyanine dyes of the formula (II) are described in Japanese Patent Provisional Publication Nos. 4-175188, 10-151861, and 11-58973:

enazoline nucleus, tellurazole nucleus, benzoltellurazole nucleus, naphthotellurazole nucleus, tellurazoline nucleus, imidazole nucleus, benzoimidazole nucleus, naphthoimidazole nucleus, pyridine nucleus, quinoline nucleus, isoquinoline nucleus, imidazo [4,5-b] quinozaline nucleus, oxadiazole nucleus, thiadiazole nucleus, tetrazole nucleus, and pyrimidine nucleus. The above heterocyclic rings may be condensed with a benzene ring or a naphthoquinone ring.

Each of the nitrogen atom-containing heterocyclic rings may have one or more substituents. The substituents may be composed of halogen, carbon, oxygen, nitrogen, sulfur, and hydrogen. Examples of the substituents (or substituent atoms) include a halogen atom, an alkyl group, an alkenyl group, an aryl group, an aralkyl group, a hetero-cyclic group, a cyano group, a nitro group, a mercapto group, a hydroxyl group, an alkoxy group, an aryloxy group, an alkylthio group, an arylthio group, an acylthio group, an acyloxy group, an amino group, an alkylamino group, a carbonamido group, a sulfonamido group, a sulfamoylamino group, an alkoxycarbonylamino group, an alkoxysulfonylanimo group, a uredio group, a thioureido group, an acyl group, an alkoxycarbonyl group, carbamoyl group, a sulfonyl group, a sulfinyl group, a sulfamoyl group, a carboxyl group (and its salt), and a sulfo group (and its salt). These groups can further have one or more substituents.

The alkyl group represented by $R^1$ or $R^2$ preferably has 1–18 (more preferably 1–8, further preferably 1–6) carbon atoms and may be of a straight chain, a cyclic chain or a branched chain. The alkyl group of $R^1$ or $R^2$ may have a substituent group.

The above-mentioned substituents are further descried below.

The halogen atoms can be fluorine, chlorine, or bromine.

The alkyl group preferably is a linear chain, branched chain, or cyclic alkyl having 1 to 18 carbon atoms (preferably 1 to 8 carbon atoms), such as methyl, ethyl, propyl, isopropyl, butyl, isobutyl, pentyl, 2-hydroxyethyl, 4-carboxybutyl, hexyl, or octyl.

The alkenyl group preferably is linear chain, branched chain, or cyclic alkenyl having 2 to 18 carbon atoms

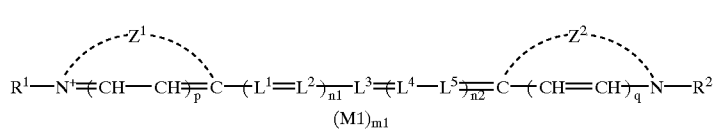

(II)

In the formula (II), each of $Z^1$ and $Z^2$ independently is an atomic group for forming a 5- or 6-membered nitrogen-containing heterocyclic ring; each of $R^1$ and $R^2$ independently is an alkyl group; each of $L^1$, $L^2$, $L^3$, $L^4$ and $L^5$ independently is a methine group which may have one or more substituents; each of n1 and n2 independently is 0, 1 or 2; each of p and q independently is 0 or 1, M1 is a charge-neutralizing counter ion; and m1 is a number of 0 or more which corresponds to an electron charge for neutralizing the cyanine dye.

Examples of the nitrogen atom-containing heterocyclic rings (nuclei) containing the atomic group employing $Z^1$ or $Z^2$ include 3,3-dialkylindolenine nucleus, 3,3-dialkylbenzoindolenine nucleus, thiazole nucleus, benzothiazole nucleus, napthothiazole nucleus, thiazoline nucleus, oxazole nucleus, benzooxazole nucleus, napthhooxazole nucleus, oxazoline nucleus, selenazole nucleus, benzoselenzazole nucleus, naphthoselenazole nucleus, sel- (preferably 2 to 8 carbon atoms), such as vinyl, allyl, 1-propenyl, 2-pentenyl, 1,3-butadienyl, or 2-octenyl.

The aryl group preferably has 6 to 10 carbon atoms, for instance, phenyl, naphthyl, 4-carboxyphenyl, 3-carboxyphenyl, 3,5-dicarboxyphenyl, 4-methanesulfonamidophenyl, and 4-butanesulfonamidophenyl.

The aralkyl group preferably has 7 to 10 carbon atoms, for instance, benzyl and phenethyl.

The heterocyclic group preferably is a 5- or 6-membered saturated or unsaturated heterocyclic group composed of carbon, nitrogen, oxygen, and/or sulfur, such as a ring of oxazole, benzoxazole, 5-carboxybenzoxazole, thiazole, imidazole, pyridine, sulforane, furan, thiophene, pyrazole, pyrrole, cumarone, or cumarince.

The alkoxy group preferably has 1 to 18 carbon toms, more preferably 1 to 8 carbon atoms, for instance, methoxy, ethoxy, propoxy, and butoxy.

The aryloxy group preferably has 6 to 10 carbon atoms, for instance, phenoxy and p-methoxyphenoxy.

The alkylthio group preferably has 1 to 18 carbon atoms, more preferably 1 to 8 carbon atoms, for instance methylthio and ethylthio.

The arylthio group preferably has 6 to 10 carbon atoms, for instance, phenylthio.

The acyloxy group preferably has 1 to 18 carbon atoms, more preferably 1 to 8 carbon atoms, for instance, acetoxy, propanoyloxy, pentanoyloxy, and octanoyloxy.

The alkylamino group preferably has 1 to 18 carbon atoms, more preferably 1 to 8 carbon atoms, for instance methylamino, dimethylamino, diethylamino, dibutylamino, and octylamino.

The carbonamido group preferably has 1 to 18 carbon atoms, more preferably 1 to 8 carbon atoms, for instance acetamido, propanoylamido, propanoylamino, pentanoylamino, octanoylamino, octanoylmethylamino, and benzamido.

The sulfonamido group preferably has 1 to 18 carbon atoms, more preferably 1 to 8 carbon atoms, for instance, methanesulfonamido, ethanesulfonamido, propanesulfonamido, butanesulfonamido, and benzenesulfonamido.

The alkoxycarbonylamino preferably has 1 to 18 carbon atoms, more preferably 1 to 8 carbon atoms, for instance, methoxycarbonylamino and ethoxycarbonylamino.

The alkoxysulfonylamino preferably has 1 to 18 carbon atoms, more preferably 1 to 8 carbon atoms, for instance, methoxysulfonylamino and ethoxysulfonylamino.

The sulfamoylamino group preferably is sulfamoylamino or a sulfamoylamino having a substituent having 1 to 18 carbon atoms, more preferably 1 to 8 carbon atoms, for instance, methylsulfamoylamino, dimethylsulfamoylamino, ethylsulfamoylamino, propylsulfamoylamino, and octylsulfamoylamino.

The ureido group may have a substituent of 1 to 18 carbon atoms, more preferably 1 to 8 carbon atoms, for instance, ureido, methylureido, N,N-dimethylureido, and octylureido.

The thioureido group may have a substituent of 1 to 18 carbon atoms, more preferably 1 to 8 carbon atoms, for instance, thioureido, methylthioureido, N,N-dimethylthioureido, and octylthioureido.

The acyl group preferably has 1 to 18 carbon atoms, more preferably 1 to 8 carbon atoms, for instance, acetyl, benzoyl, and propanoyl.

The alkoxycarbonyl preferably has 2 to 18 carbon atoms, more preferably 2 to 8 carbon atoms, for instance, methoxycarbonyl, ethoxycarbonyl, and octyloxycarbonyl.

The carbamoyl group may have a substituent of 1 to 18 carbon atoms, more preferably 1 to 8 carbon atoms, for instance carbamoyl, N,N-dimethylcarbamoyl, and N-ethylcarbamoyl.

The sulfonyl group preferably has 1 to 18 carbon atoms, more preferably 1 to 8 carbon atoms, for instance, methanesulfonyl, ethanesulfonyl, and benzenesulfonyl.

The sulfinyl group preferably has 1 to 18 carbon atoms, more preferably 1 to 8 carbon atoms, for instance, methanesulfinyl, ethanesulfinyl, and octanesulfinyl.

The sulfamoyl group may be sulfamoyl or a sulfamoyl having 1 to 18 carbon atoms, more preferably 1 to 8 carbon atoms, for instance, sulfamoyl, dimethylsulfamoyl, ethylsulfamoyl, butylsulfamoyl, octylsulfamoyl, and phenylsulfamoyl.

$Z^1$ and $Z^2$ preferably is a 3,3-dialkylindolenine or 3,3-dialkylbenzoindolenine nucleus which may have one or more substituents. More preferably, each of $Z^1$ and $Z^2$ is a 3,3-dialkylindolenine or 3,3-dialkylbenzoindolenine nucleus which may have one or more substituents.

Preferably, each of $R^1$ and $R^2$ is an alkyl group. Preferred alkyl group is a linear chain, branched chain, or cyclic alkyl having 1 to 18 carbon atoms, particularly 1 to 8 carbon atoms, which may have one or more substituents. The substituents may be those mentioned for the nitrogen atom-containing heterocyclic group. Preferred alkyl groups are unsubstituted alkyl groups, and alkyl groups having one or more substituents such as aryl, halogen, hydroxyl, alkoxy, acyloxy, carbonamido, sulfonamido, oxycarbonyl, carboxyl, and sulfo. Examples of the alkyl group include methyl, ethyl, propyl, butyl, isobutyl, 2-ethylhexyl, octyl benzyl, 2-phenylethyl, 2-hydroxyethyl, 3-hydroxypropyl, 2-carboxyethyl, 3-carboxypropyl, 4-carboxybutyl, carboxymethyl, 2-methoxyethyl, 2-(2-methoxyethoxy) ethyl, 2-sulfoethyl, 3sulfopropyl, 3-sulfobutyl, 3-sulfobutyl, 2-(3sulfopropoxy)ethyl, 2hydroxy-3-sulfopropyl, 3sulfopropoxethoxyethyl, 2-acetoxethyl, carboxymethoxymethyl, and 2-methanesulfonylaminoethyl.

The methine groups represented by $L^1$ through $L^5$ may have the same or are different from each other and each has a substituent. The substituents may be those mentioned for the nitrogen atom-containing heterocyclic group. The substituents may be combined to form a 5- to 7-membered ring, for instance, a ring of cyclopentene, 1-dimethylaminocyclopentene, 1-diphenylaminodcyclopentene, cyclohexene, 1-chlorocyclohexene, isophorone, 1-morpholinocyclopentene, or cycloheptene. Otherwise, the substituent may be combined with an auxochrome to form a ring.

Each of n1 and n2 independently 0, 1 or 2, provided that n1+n2 or 3 or less.

M1 is an electron-balancing counter ion, and may be a cation or an anion. Examples of the cations include alkali metal ions such as sodium ion, potassium ion, and lithium ion, and organic ions such as tetraalkylammonium ion and pyridinium ion. The anions may be an inorganic anion or an organic anion. Examples of the anions are as follows: halide anions (e.g., $F^{31}$, $Cl^{31}$, $Br^{31}$, and $I^{31}$), sulfonate ions (e.g., methanesulfonate ion, trifluoro-methanesulfonate ion, p-toluenesulfonate ion, p-chloro-benzenesulfonate ion, benzene-1,3-dilsulfonate ion, naphthalene-1,5-dilsulfonate ion, and naphthalene-2,6-disulfonate ion), sulfate ion (e.g., methylsulfate ion), thiocyanante ion, perchlorate ion, tetrafluoroborate ion, picrate ion, acetate ion, metal complex ion having the following formula:

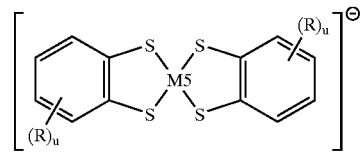

(R is a halogen atom or an alkyl group; M5 is cobalt, nickel, or copper, and u is an integer of 0 to 4), and phosphate ion (e.g., hexafluorophosphate ion).

The anion preferably is monovalent or divalent. A divalent anion is most preferred. m1 is a number of 0 or more, preferably a number of 0 to 4, which is required for balancing the electric charge. If an intra-molecular salt is formed, m1 is 0.

The compound of the formula (II) may be present in the bis-form by combining two compounds at an optionally chosen carbon site.

Representative examples of the preferred divalent anions include divalent sulfonate ions such as benzene-1,3-disulfonate ion, 3,3'-biphenyldisulfonate ion, naphthalene-1,5-disulfonate ion, naphthalene-1,6-disulfonate ion, naphthalene-2,6-disulfonate ion, 1-methylnaphthalne-2,6-disulfonate ion, naphthalene-2,7-disulfonate ion, naphthalene-2,8-disulfonate ion, 2-naphthol-6,8-disulfonate ion, 1,8-dihydroxynaphthalene-3,6-disulfonate ion, and 1,5-dihydroxynapthalene-2,6-disulfonate ions. Most preferred are naphthalene-1,5-disulfonate ion, naphthalene-1,6-disulfonate ion, naphthalene-2,6-disulfonate ion, 1-methylnaphthalne-2,6-disulfonate ion, naphthalene-2,7-disulfonate ion, and naphthalene-2,8-disulfonate ion. Particularly preferred is naphthalene-1,5-disulfonate ion.

The cyanine dyes of the formula (II) preferably have the following formula (II-1) or (II-2):

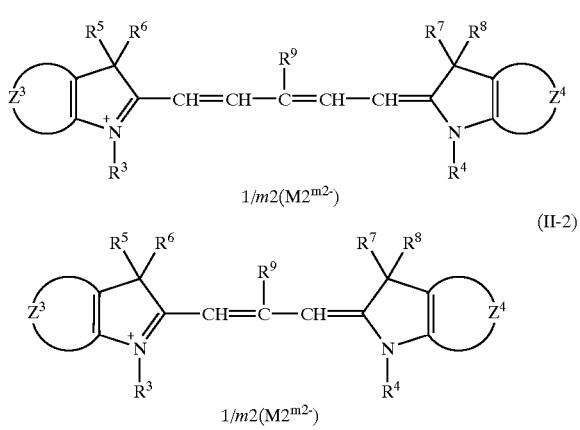

In the formula (II-1) and (II-2), each of $Z^3$ and $Z^4$ independently is an atomic group for forming a benzene or naphthalene ring which may have one or more substituents; each of $R^3$, $R^4$, $R^5$, $R^6$, and $R^7$ and $R^8$ is independently an alkyl group having 1 to 8 carbon atoms; $R^9$ is hydrogen, an alkyl group having 1 to 8 carbon atoms, an aralkyl group having 7 to 10 carbon atoms, an aryl group having 6 to 10 carbon atoms, an alkoxy group having 1 to 8 carbon atoms, a heterocyclic ring, a halogen atom, or a carbamoyl group having 1 to 8 carbon atoms; $M2^{m2-}$ is an anion; and m2 is 1 or 2.

With respect to the formulas (II-1) and (II-2), preferred combinations are described below.

Each of $Z^3$ and $Z^4$ independently is an atomic group for forming a benzene or naphthalene ring having no substituent or a benzene ring having one or two substituents. Examples of the substituents include an alkoxy having 1 to 3 carbon atoms, a halogen atom, an alkoxy group having 1 to 3 carbon atoms, a sulfonamido group, and alkoxy group. If the benzene ring has two adjoining substituents, the adjoining substituents may be combined to form a ring (e.g., 1,3-dioxorane ring).

Each of $R^3$, $R^4$ is an alkyl group having 1 to 6 carbon atoms, which may have a fluorine or alkoxy substituent.

Each of $R^5$, $R^6$, and $R^7$ and $R^8$ independently is an alkyl group having 1 to 6 carbon atoms which has no substituent.

$R^9$ is hydrogen, an alkyl group having 1 to 6 carbon atoms, phenyl, benzyl, pyridyl, pyrimidyl, benzoxazole, or halogen.

M2 is a divalent sulfonate ion, a percholrate ion, a hexafluorophosphate ion, or a metal complex ion having the following formula:

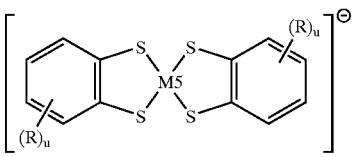

(R is a halogen atom or an alkyl group; M5 is cobalt, nickel, or copper, and u is an integer of 0 to 4).

With respect to the formula (II-1) and (II-2), most preferred combinations are described below.

Each of $Z^3$ and $Z^4$ independently is an atomic group for forming a benzene or naphthalene ring having no substituent or a benzene ring having one or two substituents. Examples of the substituents are methyl, chlorine, fluorine, methoxy, ethoxy, sulfonamido, and ethoxycarbonyl. If the benzene ring has two adjoining substituents, the adjoining substituents may be combined to form a ring (e.g., 1,3-dioxorane ring).

Each of $R^3$, $R^4$ is an alkyl group having 1 to 6 carbon atoms, which have no substituent. Preferred is methyl, ethyl, propyl, isopropyl, or butyl. Each of $R^5$, $R^6$, $R^7$ and $R^8$ independently is methyl or ethyl, $R^9$ is hydrogen, methyl, ethyl, chlorine or bromine.

M2 is divalent sulfonate ion, a perchlorate ion, a hexafluorophosphate ion, or a metal complex ion having the aforementioned formula.

The cyanine dye of the aforementioned formula (II-1) preferably has one of the following formulas (II-1-A, II-1-B, II-1-C), and the formula (II-1-B) is preferred:

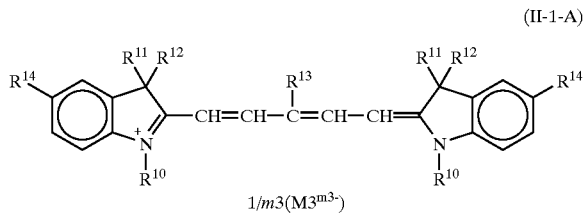

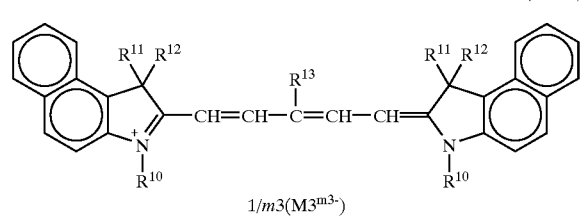

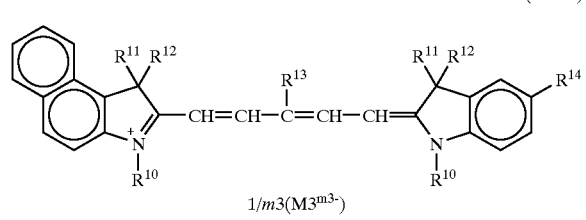

The cyanine dye of the aforementioned formula (II-2) preferably has one of the following formulas (II-2-A, II-2-B, II-2-C), and the formula (II-2-B) is preferred:

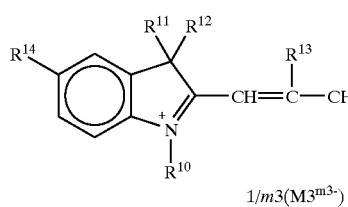
(II-2-A)

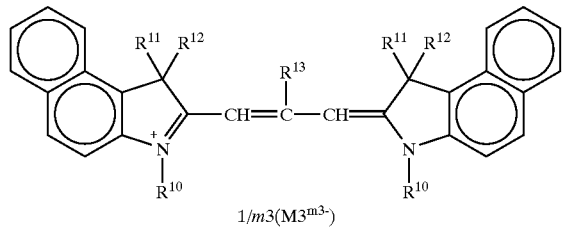
(II-2-B)

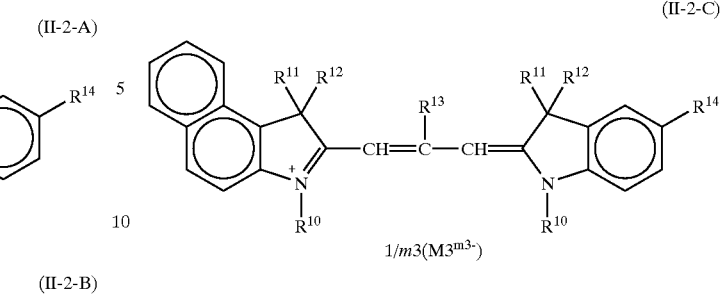
(II-2-C)

In the formulas of (II-1-A), (II-1-B), (II-1-C), (II-2A), (II-2-B), and (II-2-C), $R^{10}$ has the same meaning as that of $R^3$ or $R^4$ for the formula (II-1) or (II-2); each of $R^{11}$ and $R^{12}$ has the same meaning as that of $R^5$, $R^6$, $R^7$, or $R^8$ for the formula (II-1) or (II-2). $R^{13}$ has the same meaning as that of $R^9$ for the formula (II-1) or (II-2). $R^{14}$ is hydrogen, methyl, chlorine, fluorine, methoxy, ethoxy, sulfonamido, or ethoxycarbonyl. Each of M3 and m3 has the same meaning as that of M2 and m2, respectively, for the formula (II-1) or (II-2).

Preferred cyanine dyes having the formula (II are described below:

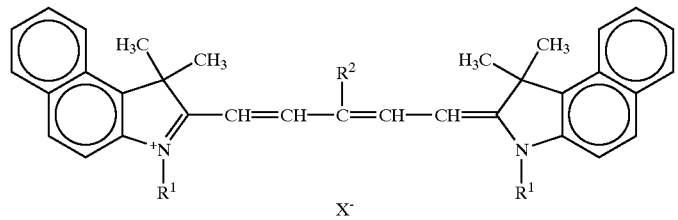

| No. | $R^1$ | $R^2$ | $X^-$ |
|---|---|---|---|
| I-1 | $CH_3$ | H | $ClO_4^-$ |
| I-2 | $CH_3$ | $CH_3$ | $ClO_4^-$ |
| I-3 | $CH_3$ | $CH_3$ | ½ (naphthalene-1,5-disulfonate) |
| I-4 | $CH_3$ | $CH_3$ | ½ (dihydroxynaphthalene disulfonate) |
| I-5 | $CH_3$ | $CH_3$ | ½ (hydroxynaphthalene disulfonate) |

-continued
| | | | |
|---|---|---|---|
| I-6 | CH₃ | Cl | ½ 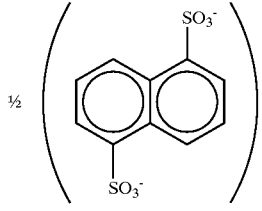 |
| I-7 | CH₃ | Br | ½ 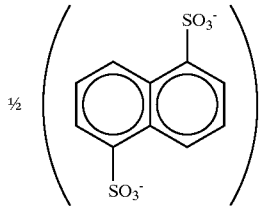 |
| I-8 | CH₃ | H | BF₄⁻ |
| I-9 | CH₃ | CH₃ | BF₄⁻ |
| I-10 | n-C₄H₉ | H | BF₄⁻ |
| I-11 | n-C₄H₉ | H | ClO₄⁻ |
| I-12 | n-C₄H₉ | CH₃ | ClO₄⁻ |
| I-13 | n-C₄H₉ | CH₃ | BF₄⁻ |
| I-14 | n-C₄H₉ | CH₃ | ½ 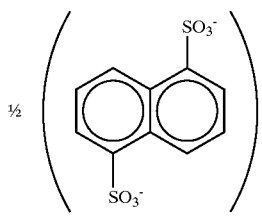 |
| I-15 | n-C₄H₉ | H | ½ 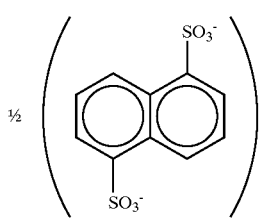 |
| I-16 | n-C₄H₉ | Cl | BF₄⁻ |
| I-17 | n-C₄H₉ | Cl | ClO₄⁻ |
| I-18 | n-C₄H₉ | Cl | ½ 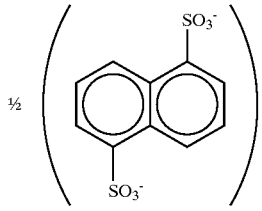 |
| I-19 | n-C₄H₉ | Cl | PF₆⁻ |
| I-20 | n-C₄H₉ | H | ½ 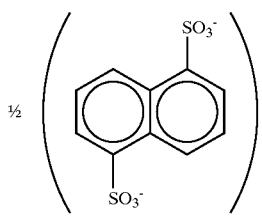 |

-continued

| | | | |
|---|---|---|---|
| I-21 | n-C₄H₉ | H | ½ (naphthalene-2,6-diol-3,7-disulfonate) |
| I-22 | n-C₄H₉ | H | ½ (4-hydroxynaphthalene-2,7-disulfonate) |
| I-23 | n-C₄H₉ | H | [Ni(bis(4-tert-butylbenzene-1,2-dithiolate))]⁻ |
| I-24 | n-C₄H₉ | H | [Cu(bis(4-tert-butylbenzene-1,2-dithiolate))]⁻ |
| I-25 | n-C₄H₉ | H | [Co(bis(4-tert-butylbenzene-1,2-dithiolate))]⁻ |
| I-26 | CH₂CH₂OCH₃ | H | BF₄⁻ |
| I-27 | CH₂CH₂OCH₃ | CH₃ | BF₄⁻ |
| I-28 | CH₂CH₂OC₂H₅ | CH₃ | BF₄⁻ |
| I-29 | CH₂CH₂OC₂H₅ | CH₃ | ClO₄⁻ |
| I-30 | CH₂CH₂OC₂H₅ | H | [Ni(bis(4-tert-butylbenzene-1,2-dithiolate))]⁻ |
| I-31 | CH₂CH₂OCH₃ | H | ½ (naphthalene-1,5-disulfonate) |
| I-32 | n-C₄H₉ | CH₂-C₆H₅ | BF₄⁻ |
| I-33 | n-C₄H₉ | 4-pyridyl | BF₄⁻ |
| I-34 | n-C₄H₉ | 2-benzoxazolyl | BF₄⁻ |

-continued

| I-35 | n-C₄H₉ | ![succinimide with N-methyl] | | BF₄⁻ |

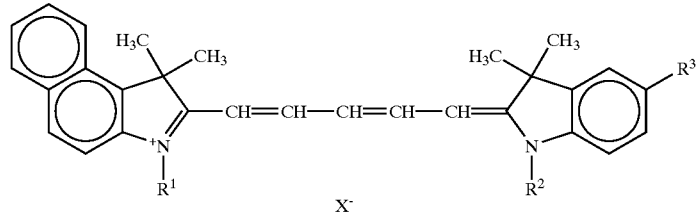

| I-36 | n-C₄H₉ | (succinimide) | | ClO₄⁻ |
| I-37 | n-C₄H₉ | (succinimide) | | ½ (naphthalene-1,5-disulfonate) |
| I-38 | CH₃ | (phenyl) | | ½ (3,6-dihydroxynaphthalene-2,7-disulfonate) |
| I-39 | CH₂CH₂OCH₃ | Cl | | BF₄⁻ |
| I-40 | CH₂CH₂OCH₃ | Cl | | ClO₄⁻ |

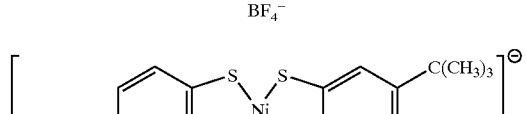

| No. | R¹ | R² | R³ | X⁻ |
|---|---|---|---|---|
| I-41 | CH₃ | CH₃ | H | ClO₄⁻ |
| I-42 | CH₃ | CH₃ | H | BF₄⁻ |
| I-43 | n-C₄H₉ | CH₃ | H | BF₄⁻ |
| I-44 | n-C₄H₉ | CH₃ | H | ClO₄⁻ |
| I-45 | n-C₄H₉ | n-C₃H₇ | H | ClO₄⁻ |
| I-46 | n-C₄H₉ | n-C₃H₇ | H | BF₄⁻ |
| I-47 | n-C₄H₉ | n-C₄H₉ | H | BF₄⁻ |
| I-48 | n-C₃H₇ | n-C₃H₇ | H | BF₄⁻ |
| I-49 | n-C₃H₇ | n-C₃H₇ | H | ClO₄⁻ |
| I-50 | n-C₄H₉ | C₂H₅ | H | ClO₄⁻ |
| I-51 | n-C₄H₉ | C₂H₅ | CH₃ | ClO₄⁻ |
| I-52 | n-C₄H₉ | C₂H₅ | CH₃ | BF₄⁻ |
| I-53 | n-C₄H₉ | CH₃ | H | [Ni(dithiolene di-t-butyl)₂]⁻ |
| I-54 | n-C₄H₉ | CH₃ | H | [Cu(dithiolene di-t-butyl)₂]⁻ |

-continued
| | | | | |
|---|---|---|---|---|
| I-55 | n-C$_4$H$_9$ | CH$_3$ | OCH$_3$ | BF$_4^-$ |
| I-56 | CH$_2$CH$_2$OCH$_3$ | CH$_3$ | H | BF$_4^-$ |
| I-57 | CH$_2$CH$_2$OCH$_3$ | CH$_2$CH$_2$OCH$_3$ | H | ClO$_4^-$ |
| I-58 | n-C$_4$H$_9$ | CH$_2$CH$_2$OCH$_2$CH$_2$OCH$_3$ | H | ClO$_4^-$ |
| I-59 | n-C$_4$H$_9$ | CH$_3$ | Cl | BF$_4^-$ |
| I-60 | n-C$_4$H$_9$ | CH$_3$ | CH$_3$ | BF$_4^-$ |
I-61 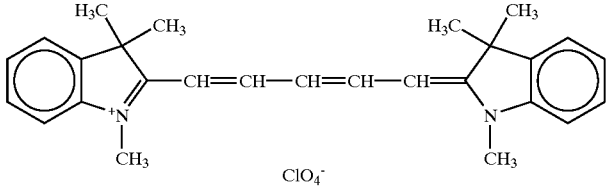
I-62 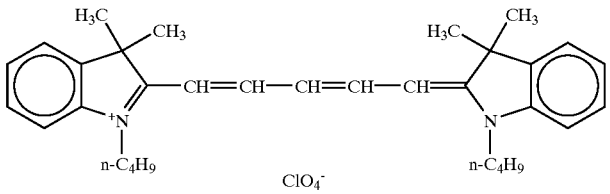
I-63 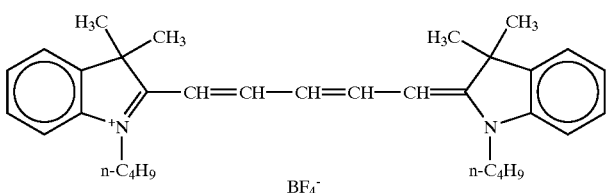
I-64 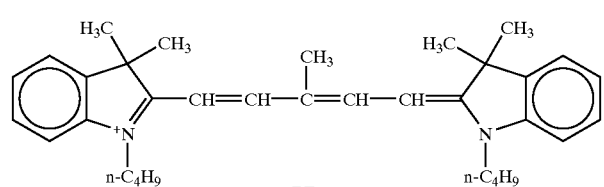
I-65 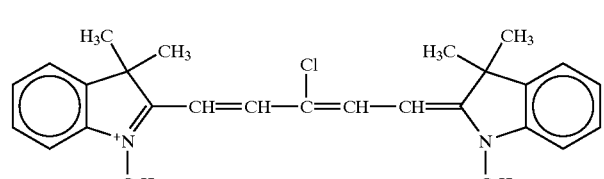
I-66 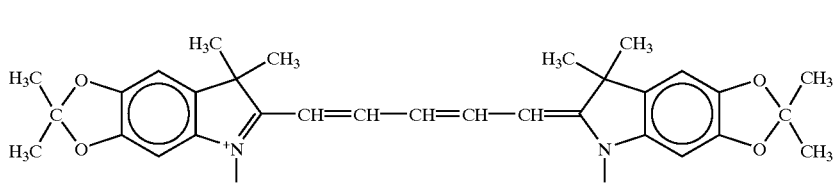
I-67 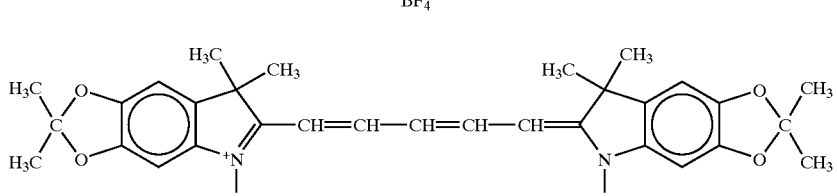

-continued
I-68 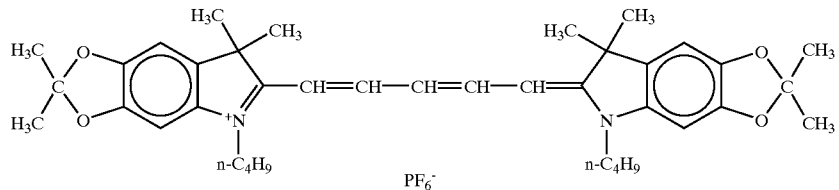
I-69 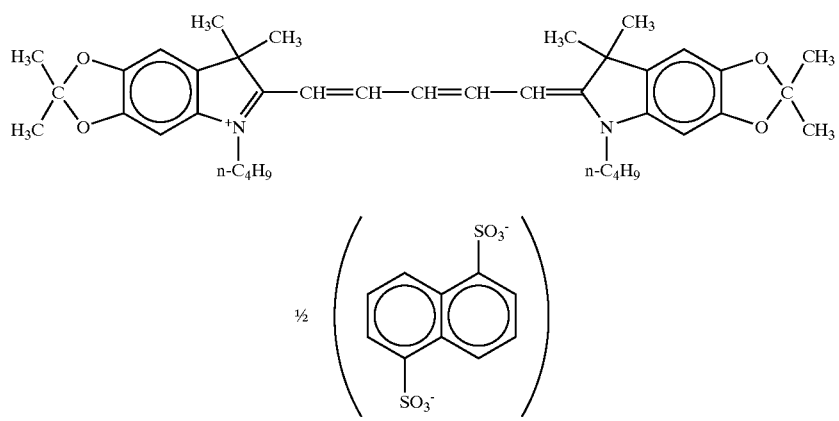
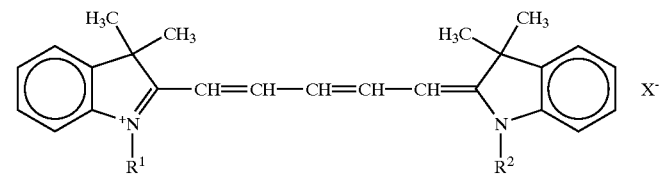
| No. | R¹ | R² | X⁻ |
|---|---|---|---|
| I-70 | CH₂CH₂OCH₃ | CH₂CH₂OCH₃ | ClO₄⁻ |
| I-71 | n-C₃H₇ | n-C₃H₇ | ClO₄⁻ |
| I-72 | n-C₄H₉ | n-C₄H₉ | 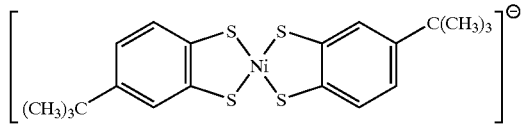 |
| I-73 | n-C₄H₉ | n-C₄H₉ | 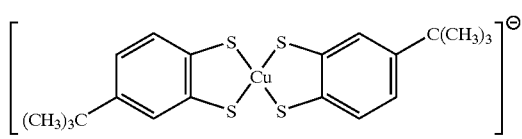 |
| I-74 | 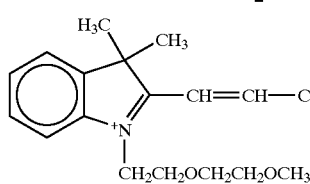 | | ClO₄⁻ |
| I-75 | 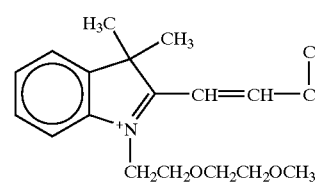 | | ClO₄⁻ |

-continued

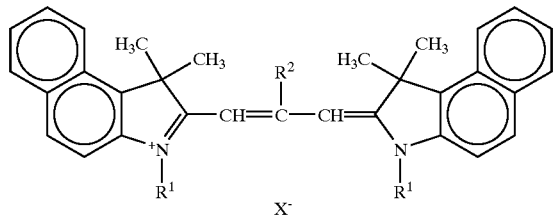

| No. | R$^1$ | R$^2$ | X$^-$ |
|---|---|---|---|
| I-76 | CH$_3$ | H | ClO$_4^-$ |
| I-77 | CH$_3$ | CH$_3$ | ClO$_4^-$ |
| I-78 | CH$_3$ | CH$_3$ | ½ (naphthalene-1,5-disulfonate) |
| I-79 | CH$_3$ | CH$_3$ | ½ (2,6-dihydroxynaphthalene-3,7-disulfonate) |
| I-80 | CH$_3$ | CH$_3$ | ½ (4-hydroxynaphthalene-2,7-disulfonate) |
| I-81 | CH$_3$ | H | BF$_4^-$ |
| I-82 | CH$_3$ | CH$_3$ | BF$_4^-$ |
| I-83 | n-C$_4$H$_9$ | H | BF$_4^-$ |
| I-84 | n-C$_4$H$_9$ | H | ClO$_4^-$ |
| I-85 | n-C$_4$H$_9$ | CH$_3$ | ClO$_4^-$ |
| I-86 | n-C$_4$H$_9$ | CH$_3$ | BF$_4^-$ |
| I-87 | n-C$_4$H$_9$ | CH$_3$ | ½ (naphthalene-1,5-disulfonate) |
| I-88 | n-C$_4$H$_9$ | H | ½ (naphthalene-1,5-disulfonate) |

-continued
| | | | |
|---|---|---|---|
| I-89 | n-C₄H₉ | H | 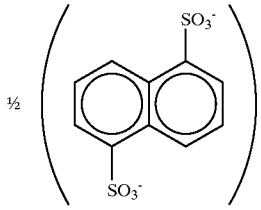 |
| I-90 | n-C₄H₉ | H | 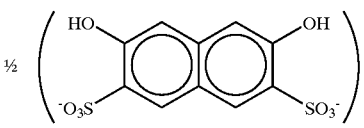 |
| I-91 | n-C₄H₉ | H | 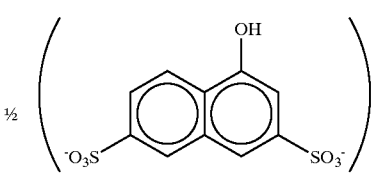 |
| I-92 | n-C₄H₉ | H | 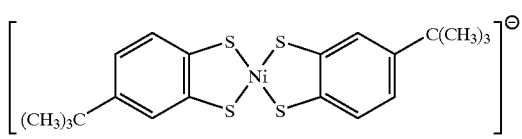 |
| I-93 | n-C₄H₉ | H | 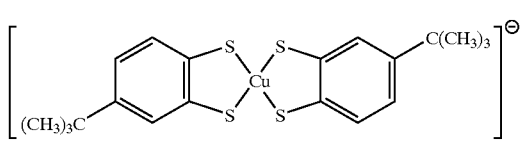 |
| I-94 | n-C₄H₉ | H | 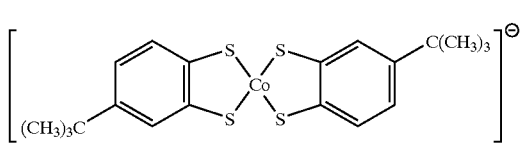 |
| I-95 | CH₂CH₂OCH₃ | H | BF₄⁻ |
| I-96 | CH₂CH₂OCH₃ | CH₃ | BF₄⁻ |
| I-97 | CH₂CH₂OC₂H₅ | CH₃ | BF₄⁻ |
| I-98 | CH₂CH₂OC₂H₅ | CH₃ | ClO₄⁻ |
| I-99 | CH₂CH₂OC₂H₅ | H | 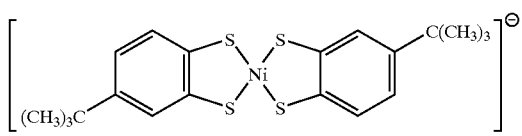 |
| I-100 | CH₂CH₂OCH₃ | H | 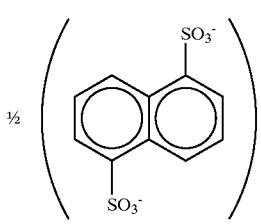 |
| I-101 | n-C₄H₉ | H | BF₄⁻ |

-continued

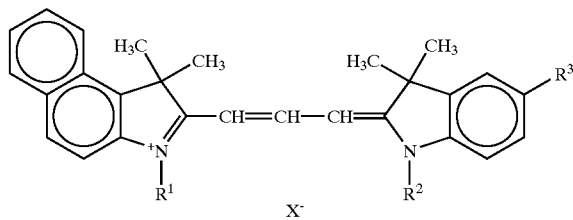

| No. | R¹ | R² | R³ | X⁻ |
|---|---|---|---|---|
| I-102 | CH₃ | CH₃ | H | ClO₄⁻ |
| I-103 | CH₃ | CH₃ | H | BF₄⁻ |
| I-104 | n-C₄H₉ | CH₃ | H | BF₄⁻ |
| I-105 | n-C₄H₉ | CH₃ | H | ClO₄⁻ |
| I-106 | n-C₄H₉ | n-C₃H₇ | H | ClO₄⁻ |
| I-107 | n-C₄H₉ | n-C₃H₇ | H | BF₄⁻ |
| I-108 | n-C₄H₉ | n-C₄H₉ | H | BF₄⁻ |
| I-109 | n-C₃H₇ | n-C₃H₇ | H | BF₄⁻ |
| I-110 | n-C₃H₇ | n-C₃H₇ | H | ClO₄⁻ |
| I-111 | n-C₄H₉ | C₂H₅ | H | ClO₄⁻ |
| I-112 | n-C₄H₉ | C₂H₅ | CH₃ | ClO₄⁻ |
| I-113 | n-C₄H₉ | C₂H₅ | CH₃ | BF₄⁻ |
| I-114 | n-C₄H₉ | CH₃ | H | [Ni(dithiolate) complex]⁻ |
| I-115 | n-C₄H₉ | CH₃ | H | [Cu(dithiolate) complex]⁻ |
| I-116 | n-C₄H₉ | CH₃ | OCH₃ | BF₄⁻ |
| I-117 | CH₂CH₂OCH₃ | CH₃ | H | BF₄⁻ |
| I-118 | CH₂CH₂OCH₃ | CH₂CH₂OCH₃ | H | ClO₄⁻ |
| I-119 | n-C₄H₉ | CH₂CH₂OCH₂CH₂OCH₃ | H | ClO₄⁻ |
| I-120 | n-C₄H₉ | CH₃ | Cl | BF₄⁻ |
| I-121 | n-C₄H₉ | CH₃ | CH₃ | BF₄⁻ |

I-122, I-123, I-124: (structures shown)

-continued
I-125 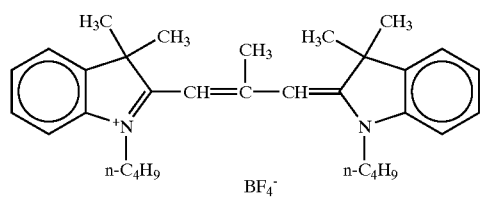
I-126 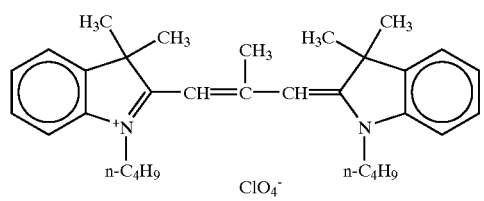
I-127 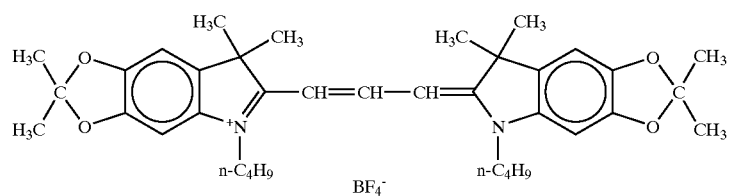
I-128 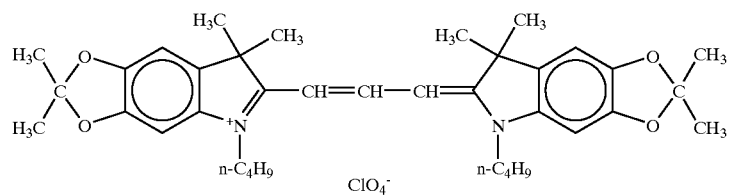
I-129 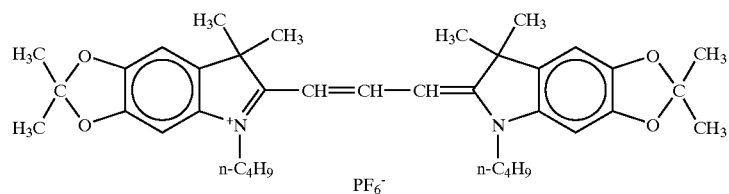
I-130 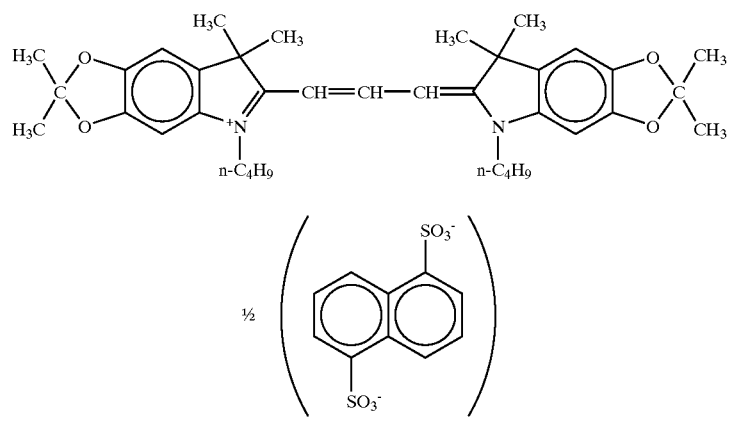

-continued

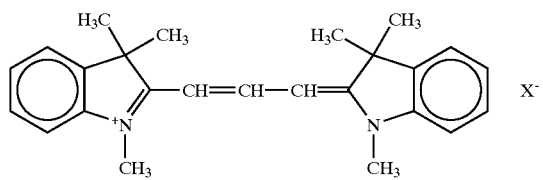

| No. | $R^1$ | $R^2$ | $X^-$ |
|---|---|---|---|
| I-131 | $CH_2CH_2OCH_3$ | $CH_2CH_2OCH_3$ | $ClO_4^-$ |
| I-132 | $n\text{-}C_3H_7$ | $n\text{-}C_3H_7$ | $ClO_4^-$ |
| I-133 | $n\text{-}C_4H_9$ | $n\text{-}C_4H_9$ | [Ni bis-dithiolene with $C(CH_3)_3$ and $(CH_3)_3C$ substituents]$^\ominus$ |
| I-134 | $n\text{-}C_4H_9$ | $n\text{-}C_4H_9$ | [Cu bis-dithiolene with $C(CH_3)_3$ and $(CH_3)_3C$ substituents]$^\ominus$ |
| I-135 | (bis-indoline trimethine cation with N-$CH_2CH_2OCH_2CH_2OCH_3$ groups) | | $ClO_4^-$ |

| No. | $R^1$ | $R^2$ | $R^3$ | X | M |
|---|---|---|---|---|---|
| I-136 | $C_2H_5$ | $C_2H_5$ | $CH_3$ | H | $I^-$ |
| I-137 | $CH_3$ | $CH_3$ | H | $\text{NHCO-phenyl}$ | $I^-$ |
| I-138 | $CH_3$ | $CH_3$ | H | $CH_3$ | $I^-$ |

| No. | $R^1$ | $R^2$ | X | M |
|---|---|---|---|---|
| I-139 | $CH_3$ | $CH_3$ | H | $I^-$ |
| I-140 | $C_2H_5$ | $C_2H_5$ | Br | $I^-$ |
| I-141 | $(CH_2)_2CO_2H$ | Br | $\underset{O}{\overset{\|}{C}}CH_2CH_2OH$ | $Na^+$ |

-continued
I-142 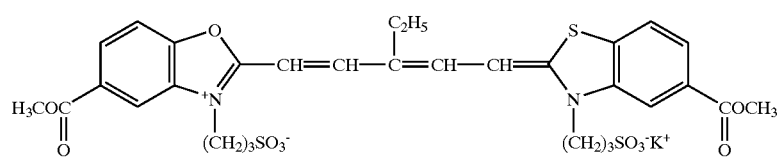
I-143 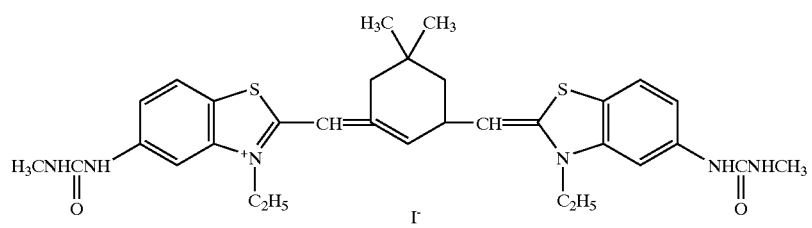
I-144 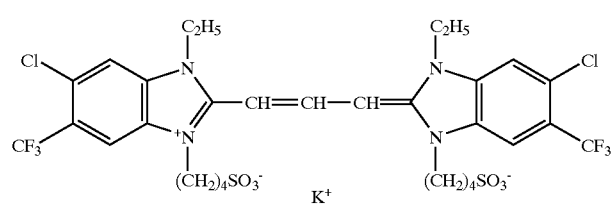
I-145 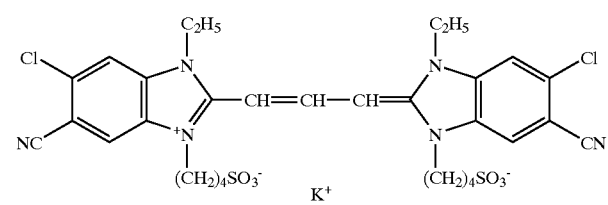
I-146 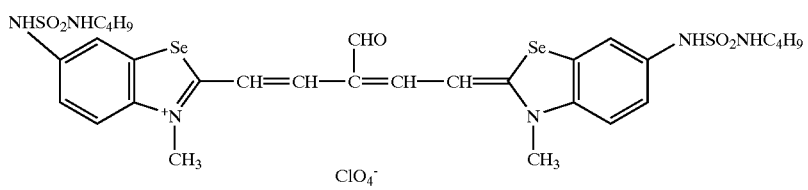
I-147 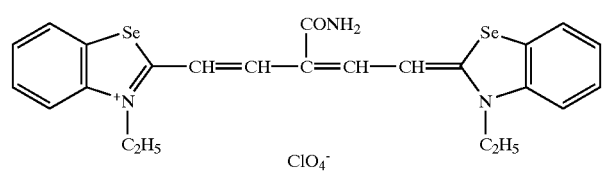
I-148 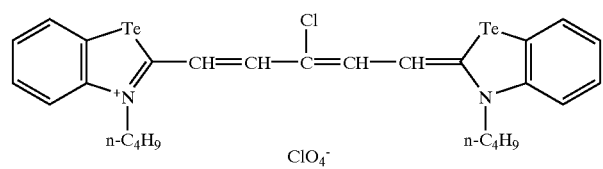
I-149 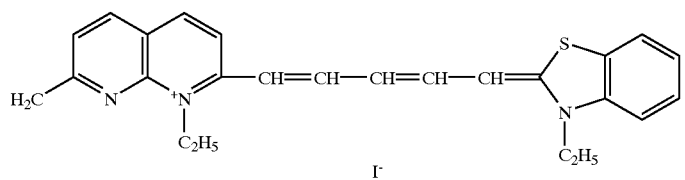

-continued

I-150

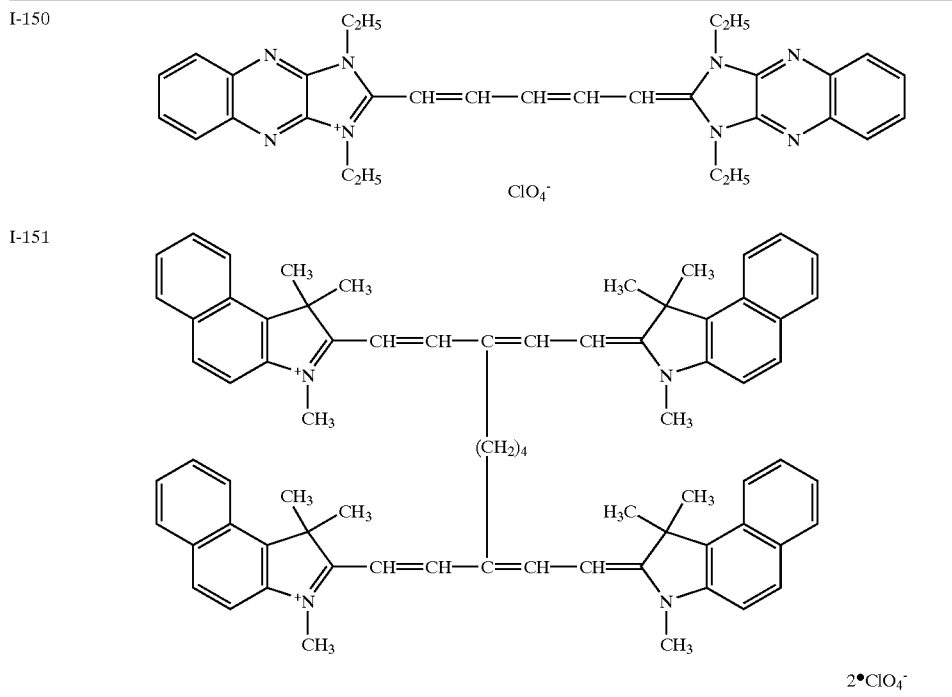

I-151

The azo dyes are preferably represented by the following formula (III):

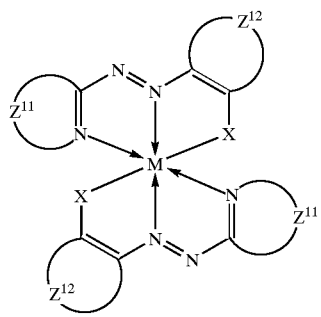

(III)

In the formula (III), M is a metal atom; X is an oxygen atom, a sulfur atom, or =NR$^{11}$ in which R$^{11}$ represents hydrogen, an alkyl group, an aryl group, an acyl group, an alkylsulfonyl group or an arylsulfonyl group; Z$^{11}$ is an atomic group for forming a 5— or 6-membered nitrogen-containing heterocyclic ring; and Z$^{12}$ is an atomic group for forming an aromatic ring or a heterocyclic aromatic ring. Each ring may has one or more substituents.

The azo dyes of the formula (III) preferably have the following formula (III-1):

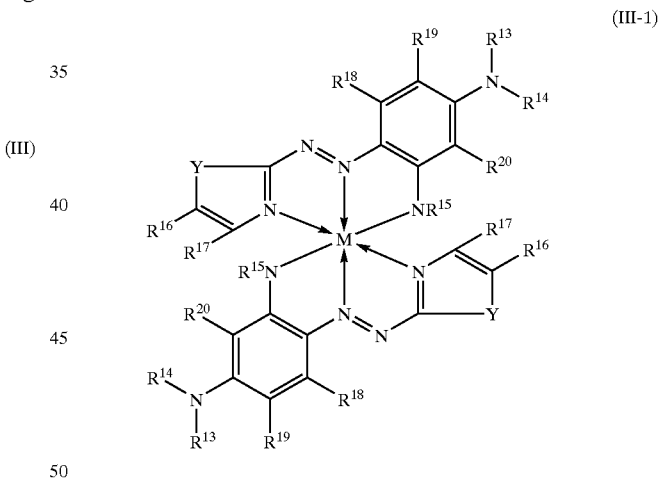

(III-1)

In the formula (III-1), M is iron, cobalt, nickel, copper, zinc, palladium, platinum or gold; Y is oxygen atom, sulfur atom or =NR$^{12}$; each of R$^{12}$, R$^{13}$ and R$^{14}$ independently is an alkyl group having 1 to 12 carbon atoms which may have one or more substituents; R$^{13}$ and R$^{14}$ may be combined to form a ring; R$^{15}$ is an alkyl group having 1 to 12 carbon atoms which may have one or more substituents, a phenyl group having 6 to 16 carbon atoms which may have one or more substituents, or naphthyl group; each of R$^{16}$ and R$^{17}$ independently is hydrogen, a halogen atom, an alkyl group, an aryl group, cyano, an acyl group, an alkylsulfonyl group, or an arylsulfonyl group; and each of R$^{18}$, R$^{19}$ and R$^{20}$ independently is hydrogen, an alkyl group, an aryl group, hydroxyl, a alkoxy group, an aryloxy group, amino, a carboxylic amide group, a sulfonamide group, cyano, a halogen atom, an acyl group, an alkylsulfonyl group, or an arylsulfonyl group.

The azo dyes of the formula (III-1) preferably have the following formula (III-2).

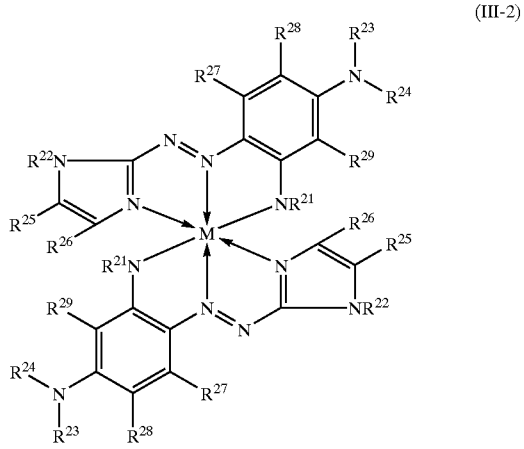

(III-2)

In the formula (III-2), M preferably is iron, cobalt, or nickel. Nickel is most preferred.

$R^{21}$ preferably is an alkylsulfonyl group having 1 to 4 carbon atoms or an arylsulfonyl group having 6 to 10 carbon atoms, which may have one or more substituents. Particularly preferred are an alkylsulfonyl group having 1 to 4 carbon atoms which has no substituents or has a fluorine atom substituent (e.g., methylsulfonyl or trifluoromethylsulfonyl) and an arylsulfonyl group having 6 to 10 carbon atoms, which has no substituent (e.g., phenylsulfonyl).

Each of $R^{22}$, $R^{23}$ and $R^{24}$ preferably is an alkyl group having 1 to 4 carbon atoms which may have one or more substituents. Preferred substituents are halogen, hydroxyl, cyano, alkoxy, alkylthio, arylthio, acyl, alkylsulfonyl, and arylsulfonyl. More preferably, each of $R^{22}$, $R^{23}$ and $R^{24}$ independently is an alkyl group having 1 to 4 carbon atoms which has no substituent. It is also preferred that $R^{23}$ and $R^{24}$ are combined to form a ring (e.g., pyrrolidine or morpholine).

Each of $R^{25}$ and $R^{26}$ preferably is cyano, acyl, alkylsulfonyl, or arylsulfonyl. Most preferred is cyano for each of $R^{25}$ and $R^{26}$.

Each of $R^{27}$, $R^{28}$ and $R^{29}$ preferably is hydrogen, alkyl, aryl, hydroxyl, alkoxy, aryloxy, amino, carbonamio, or sulfonamido. Most preferred is hydrogen for each of $R^{27}$, $R^{28}$ and $R^{29}$.

Representative examples of the azo dyes of the formula (III) are described below.

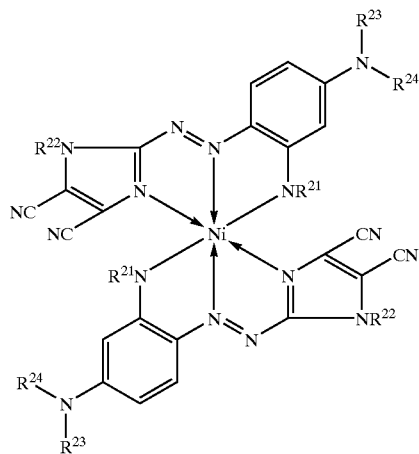

| No. | $R^{21}$ | $R^{22}$ | $R^{23}$ | $R^{24}$ |
|---|---|---|---|---|
| II-1 | SO$_2$CF$_3$ | C$_2$H$_5$ | C$_2$H$_5$ | C$_2$H$_5$ |
| II-2 | SO$_2$CF$_3$ | n-C$_4$H$_9$ | C$_2$H$_5$ | C$_2$H$_5$ |
| II-3 | SO$_2$CF$_3$ | n-C$_4$H$_9$ | C$_2$H$_4$CN | C$_2$H$_5$ |
| II-4 | SO$_2$CF$_3$ | n-C$_4$H$_9$ | —(CH$_2$)$_4$— * | |
| II-5 | SO$_2$CF$_3$ | n-C$_4$H$_9$ | —CH$_2$CH$_2$OCH$_2$CH$_2$— ** | |
| II-6 | SO$_2$CH$_3$ | C$_2$H$_5$ | C$_2$H$_5$ | C$_2$H$_5$ |
| II-7 | —SO$_2$—C$_6$H$_5$ | C$_2$H$_5$ | C$_2$H$_5$ | C$_2$H$_5$ |
| II-8 | SO$_2$CF$_3$ | C$_2$H$_5$ | CH$_2$CH$_2$OH | C$_2$H$_5$ |
| II-9 | SO$_2$CF$_3$ | n-C$_3$H$_7$ | C$_2$H$_5$ | C$_2$H$_5$ |
| II-10 | SO$_2$CF$_3$ | CH$_2$CH$_2$OCH$_3$ | C$_2$H$_5$ | C$_2$H$_5$ |

-continued

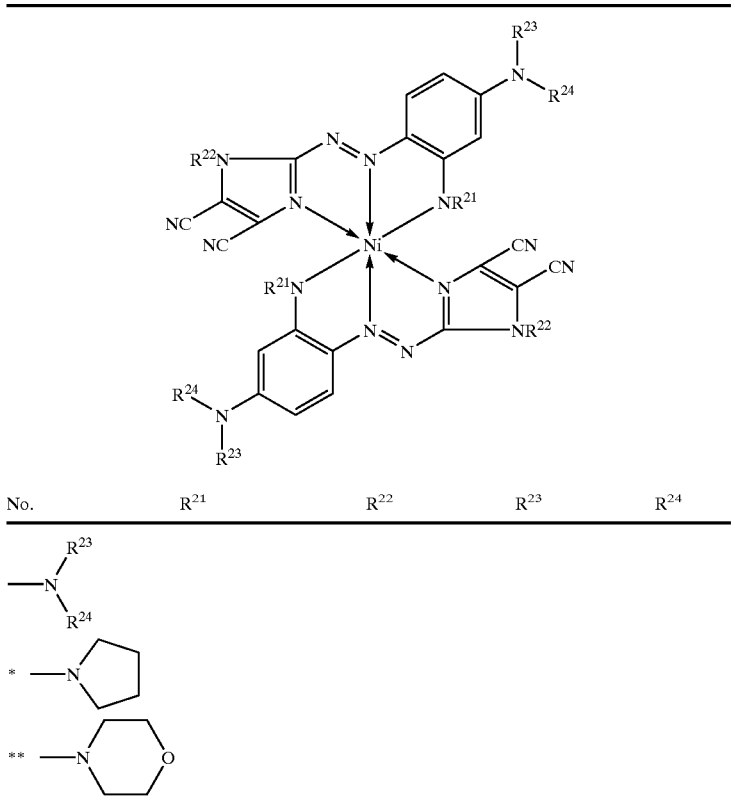

| No. | $R^{21}$ | $R^{22}$ | $R^{23}$ | $R^{24}$ |
| --- | --- | --- | --- | --- |

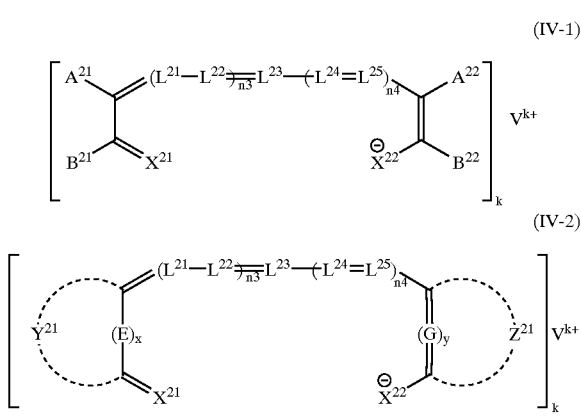

The oxonol dyes are preferably compounds represented by the following formula (IV-1) or (IV-2) are described in Japanese Patent Provisional Publication Nos. 10-297103, 10-309871, and 10-309872.

$$\left[ \begin{array}{c} A^{21} \\ B^{21} \end{array} \diagdown \diagup (L^{21}-L^{22})_{n3} L^{23}-(L^{24}=L^{25})_{n4} \diagdown \diagup A^{22} \\ X^{21} \quad\quad\quad\quad\quad\quad\quad\quad\quad X^{22} \diagdown B^{22} \overset{\ominus}{} \right]_k V^{k+} \quad (IV\text{-}1)$$

$$\left[ \begin{array}{c} Y^{21} \\ (E)_x \end{array} \diagdown \diagup (L^{21}-L^{22})_{n3} L^{23}-(L^{24}=L^{25})_{n4} \diagdown \diagup Z^{21} \\ X^{21} \quad\quad\quad\quad\quad\quad\quad\quad\quad X^{22} \overset{\ominus}{} (G)_y \right]_k V^{k+} \quad (IV\text{-}2)$$

In the formulas (IV-1) and (IV-2), each of $A^{21}$, $A^{22}$, $B^{21}$ and $B^{22}$ independently is a substituent group; each of $Y^{21}$ and $Z^{21}$ independently is an atomic group for forming a carbocyclic or heterocyclic ring; each of E and G independently is an atomic group for forming a conjugated double bond chain; $X^{21}$ is =O, =NR$^{21}$ or =C(CN)$_2$; $X^{22}$ is -O, -NR$^{21}$ or -C(CN)$_2$ [in which R$^{21}$ is a substituent group]; each of $L^{21}$, $L^{22}$, $L^{23}$, $L^{24}$ and $L^{25}$ independently is a methine group which may be substituted; $V^{k+}$ is a cation; each of n3 and n4 independently is 0, 1 or 2; each of x and y independently is 0 or 1; and k is an integer of 1 to 10.

Examples of the substituents groups represented by $A^{21}$, $A^{22}$, $B^{21}$ and $B^{22}$ include a linear (or straight) chain, branched chain, or cyclic alkyl group having 1 to 18 carbon atoms, particularly 1 to 8 carbon atoms, which may have one or more substituents; an alkenyl group having 2 to 18 carbon atoms, particularly 2 to 8 carbon atom; an aryl group having 6 to 18 carbon atoms, particularly 6 to 10 carbon atoms, which may have one or more substituents; an aralkyl group having 7 to 18 carbon atoms, particularly 7 to 12 carbon atoms, which may have one or more substituents; an acyl group having 2 to 18 carbon atoms, particularly 2 to 8 carbon atoms, which may have one or more substituents; an alkyl- or arylsulfonyl group having 1 to 18 carbon atoms, particularly 1 to 8 carbon atoms, which may have one or more substituents; an alkylsulfinyl group having 1 to 18 carbon atoms, particularly 1 to 8 carbon atoms, an alkoxycarbonyl group having 2 to 18 carbon atoms, particularly 2 to 8 carbon atoms, an aryl-oxycarbonyl having 7 to 18 carbon atoms, particularly 7 to 12 carbon atoms, an alkoxy group having 1 to 18 carbon atoms, particularly 1 to 8 carbon atoms, which may have one or more substituents; an aryloxy group having 6 to 18 carbon atoms, particularly 6 to 10 carbon atoms, which may have one or more substituents; an alkylthio group having 1 to 18 carbon atoms, particularly 1 to 8 carbon atoms, an arylthio group having 6 to 18 carbon atoms, particularly 6 to 10 carbon atoms; an acyloxy group having 2 to 18 carbon atoms, particularly 2 to 8 carbon atoms, which may have one or more substituents; a sulfonyloxy group having 1 to 18 carbon atoms, particularly 1 to 8 carbon atoms, which may have one or more substituents; a carbamoyloxy group having 1 to 18 carbon atoms, particularly 1 to 8 carbon atoms, which may have one or more substituents; an unsubstituted amino group; an amino group having a substituent which has 1 to 18 carbon atoms, particularly 1 to 8 carbon atoms, an unsubstituted carbamoyl group; a carbamoyl group having a substituent which has 1 to 18 carbon atoms, particularly 1 to 8 carbon atoms; an unsubstituted sulfamoyl group; a sulfamoyl group having a substituent which has 1 to 18 carbon atoms, particularly 1 to 8 carbon atoms; a halogen atom, and a heterocyclic group. These substituents may have one or more substituents.

Each of $[-C(=L^{21})-(E)_x-C(=X^{21})-]$ (referred to as W1) combined with $Y^{21}$ and $[-C(=L^{25})-(G)_y-C(-X^{22})-]$ (referred to as W2) combined with $Z^{21}$ is under conjugated condition. Therefore, a carbon ring or a heterocyclic ring formed by $Y^{21}$ and W1 as well as $Z^{21}$ and W2 is in a resonance structure. The carbon ring or heterocyclic ring preferably is one of 4- to 7- membered rings, preferably 5- to 6-membered rings. These rings may be fused with other 4- to 7-membered rings to form a condensed ring. These rings may have one or more substituents such as those hereinbefore described for $A^{21}$, $A^{22}$, $B^{21}$ and $B^{22}$.

It is preferred that each of x and y is 0. It is also preferred that $X^{21}$ is =O and $X^{22}$ is -O.

The oxonol dyes are preferably represented by the following formula (IV-2-A):

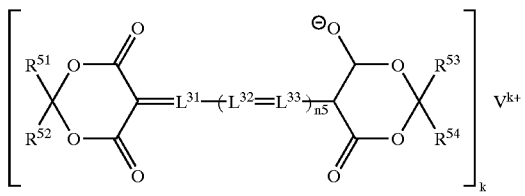

(IV-2-A)

In the formula, each of $R^{51}$, $R^{52}$, $R^{53}$ and $R^{54}$ independently is hydrogen, an alkyl group, an aryl group, an aralkyl group, or heterocyclic group. These group may have one or more substituents. Each of $L^{31}$, $L^{32}$, and $L^{33}$ independently is a methine group which may have a substituent. n5 is 0, 1, 2, or 3. If n5 is 2 or 3, each of the plural $L^{32}$ and $L^{33}$ may be the same or different. $V^{k+}$ is a cation. k is an integer of 1 to 10.

The anionic component (namely, anion part) is described below.

The alkyl group for $R^{51}$, $R^{52}$, $R^{53}$ and $R^{54}$ preferably is an alkyl group having 1 to 20 carbon atoms, which may have one or more substituents, such as methyl, ethyl, propyl, butyl, isobutyl, t-butyl, isoamyl, cyclopropyl, or cyclohexyl.

Examples of the above-mentioned substituents include an alkyl group having 1 to 20 carbon atoms (e.g., methyl, ethyl, propyl, carboxymethyl, or ethoxycarbonyl); an aralkyl group having 7 to 20 carbon atoms (e.g., benzyl or phenethyl); an alkoxy group having 1 to 8 carbon atoms (e.g., methoxy or ethoxy); an aryl group having 6 to 20 carbon atoms (e.g., phenyl or naphthyl); an aryloxy group having 6 to 20 carbon atoms (e.g., phenoxy or naphthoxy); a heterocyclic group (e.g., pyridyl, pyrimidyl, pyridazyl, benzoimidazolyl, benzothiazolyl, benzoxazolyl, 2-pyrrolidin-1-yl, 2-peperidon-1-yl, 2,4 dioxyimidazolidin-3-yl, 2,4-dioxyoxazolidin-3-yl, succinimido, phthalimido, or maleimido); a halogen atom (e.g., fluorine, chlorine, bromine, or iodine); a carboxyl group; an alkoxycarbonyl group having 2 to 10 carbon atoms (e.g., methoxycarbonyl or ethoxycarbonyl); a cyano gorup; an acyl group having 2 to 10 carbon atoms (e.g., acetyl or pivaloyl); a carbamoyl group having 1 to 10 carbon atoms (e.g., carbamoyl, methyl carbamoyl, or morpholinocarbamoyl); an amino group; an amino group having a substituent which has 1 to 20 carbon atoms (e.g., dimethylamino, diethylamino, bis(methylsulfonylethyl)amino, or N-ethyl-$N^1$-sulfoethyl-amino); a sulfo group; a hydroxyl group; a nitro group; a sulfonamido group having 1 to 10 carbon atoms (e.g., methanesulfonamido); a ureido group having 1 to 10 carbon atoms (e.g., ureido or methylureido); a sulfonyl group having 1 to 10 carbon atoms (e.g., methanesulfonyl or ethanesulfamoyl); a sulfinyl group having 1 to 10 carbon atoms (e.g., methanesulfinyl); and a sulfamoyl group having 0 to 10 carbon atoms (e.g., sulfamoyl or methanesulfamoyl). The carboxyl group and sulfo group may be in the form of a salt.

The aryl group for $R^{51}$, $R^{52}$, $R^{53}$ and $R^{54}$ can be an aryl group having 6 to 20 carbon atoms (e.g., phenyl or naphthyl). The aryl group may have one or more substituents such as those described above.

The aralkyl group for $R^{51}$, $R^{52}$, $R^{53}$ and $R^{54}$ can be an aralkyl group having 7 to 20 carbon atoms (e.g., benzyl or phenethyl). The aralkyl group may have one or more substituents such as those described above.

The heterocyclic group for $R^{51}$, $R^{52}$, $R^{53}$ and $R^{54}$ can be a 5—or 6-membered saturated or unsaturated heterocyclic group which comprises one or more of carbon atoms, nitrogen atoms, oxygen atoms, and/or sulfur atoms. Examples include pyridyl, pyrimidyl, pyridazyl, piperidyl, triazyl, pyrrolyl, imidzolyl, triazolyl, furanyl, thiophenyl, thiazolyl, oxazolyl, isothiazolyl, and isoxazolyl. These heterocyclic group may be fused with a benzene ring to form a condensed ring, such as, quinolyl, benzoimidazolyl, benzothiazolyl, or benzoxazolyl. The heterocyclic group may have one or more substituents such as those described above.

Each of $R^{51}$, $R^{52}$, $R^{53}$ and $R^{54}$ preferably is an alkyl group having 1 to 8 carbon atoms, an aryl group having 6 to 10 carbon atoms, an aralkyl group having 7 to 10 carbon atoms, or a heterocyclic group having 6 to 10 carbon atoms.

If each of $R^{51}$, $R^{52}$, $R^{53}$ and $R^{54}$ is an alkyl group, $R^{51}$ and $R^{52}$ or $R^{53}$ and $R^{54}$ can be combined to form a carbon ring (e.g., cyclopropyl, cyclobutyl, cyclopentyl, cyclohexyl, 2-methylcyclohexyl, cycloheptyl, or cyclooctyl) or a heterocyclic ring (e.g., piperidyl, curomanyl, or morpholyl). $R^{51}$ and $R^{52}$ or $R^{53}$ and $R^{54}$ are preferably combined to form a carbon ring having 3 to 10 carbon atoms or a heterocyclic group having 2 to 10 carbon atoms.

Each of $L^{31}$, $L^{32}$ and $L^{33}$ independently is a substituted or unsubstituted methine group. Examples of the substituents can be those described hereinbefore. Each of $L^{31}$, $L^{32}$ and $L^{33}$ preferably is an unsubstituted methine group, or a methine group having a substituent such as an alkyl group having 1 to 5 carbon atoms, an aralkyl group having 7 to 10 carbon atoms, an aryl group having 6 to 10 carbon atoms, a saturated or unsaturated heterocyclic group, or a halogen atom. n5 preferably is 1, 2 or 3.

Preferred anion parts of the oxonol dyes having the formula (IV-1) or (IV-2), particularly (IV-2-A), are illustrated below.

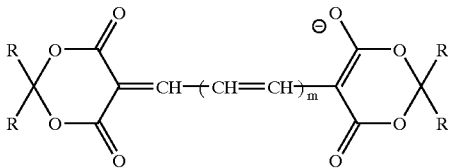
| No. | R | m |
|---|---|---|
| A-1 | H | 3 |
| A-2 | H | 2 |
| A-3 | H | 1 |
| A-4 | CH$_3$ | 3 |
| A-5 | CH$_3$ | 2 |
| A-6 | CH$_3$ | 1 |
| A-7 | CH$_3$ | 0 |
| A-8 | C$_2$H$_5$ | 3 |
| A-9 | C$_2$H$_5$ | 2 |
| A-10 | C$_3$H$_7$ | 3 |
| A-11 | C$_3$H$_7$ | 2 |
| A-12 | C$_3$H$_7$ | 1 |
| A-13 | CH$_2$C(CH$_3$)$_3$ | 3 |
| A-14 | CH$_2$CH(CH$_3$)$_2$ | 3 |
| A-15 | CH$_2$CH(CH$_3$)$_2$ | 2 |
| A-16 | CH$_2$CH(CH$_3$)$_2$ | 1 |
| A-17 | 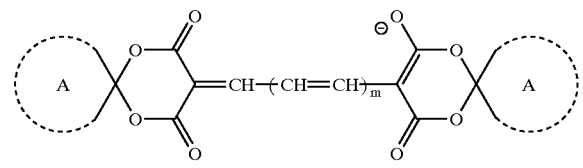 | 3 |
| A-18 |  | 3 |
| A-19 |  | 2 |
| A-20 | CF$_3$ | 3 |
| A-21 | CF$_3$ | 2 |
| A-22 | CF$_3$ | 1 |
| A-23 | CH=C(CH$_3$)$_2$ | 2 |
| A-24 | CH$_2$Cl | 2 |
| A-25 | CH$_2$OH | 2 |
| A-26 | CH$_2$OH | 3 |
| A-27 | CH$_2$CH$_2$OH | 3 |
| A-28 | CH$_2$CH$_2$OH | 2 |
| A-29 | CH$_2$CH$_2$OH | 1 |
| A-30 | CH$_2$CH$_2$OCH$_3$ | 2 |
| A-31 | CH$_2$CH$_2$OCH$_3$ | 3 |
| A-32 | CH$_2$CH$_2$N(CH$_3$)$_2$ | 2 |
| A-33 |  | 2 |
| A-34 | 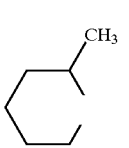 | 3 |
| A-35 | 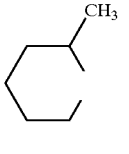 | 2 |
-continued
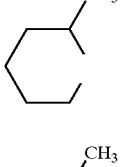
| No. | A (Ring Structure) | m |
|---|---|---|
| A-36 | 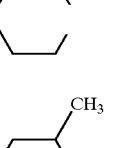 | 2 |
| A-37 | 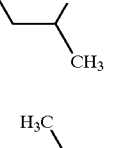 | 2 |
| A-38 | 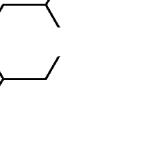 | 3 |
| A-39 |  | 3 |
| A-40 | 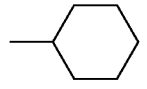 | 2 |
| A-41 | 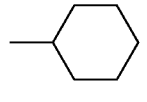 | 1 |
| A-42 | 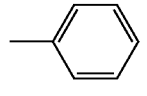 | 0 |
| A-43 | 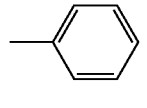 | 3 |
| A-44 | 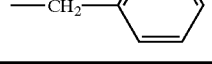 | 3 |

-continued
| | | |
|---|---|---|
| A-45 | 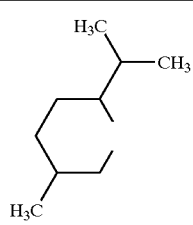 | 2 |
| A-46 |  | 2 |
| A-47 | 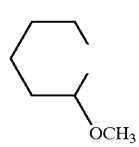 | 2 |
| A-48 | 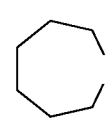 | 2 |
| A-49 | 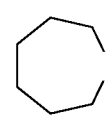 | 3 |
| A-50 | 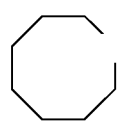 | 2 |
-continued
| | | |
|---|---|---|
| A-51 | 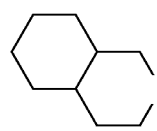 | 2 |
| A-52 | 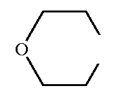 | 2 |
| A-53 |  | 2 |
| A-54 | 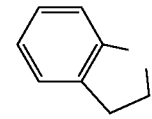 | 2 |
| A-55 | | 2 |
| A-56 | 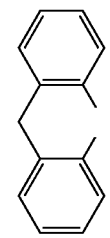 | 2 |
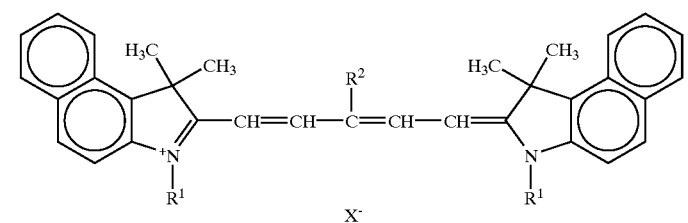
| No. | $R^1$ | $R^2$ | $X^-$ |
|---|---|---|---|
| I-1 | $CH_3$ | H | $ClO_4^-$ |
| I-2 | $CH_3$ | $CH_3$ | $ClO_4^-$ |

-continued
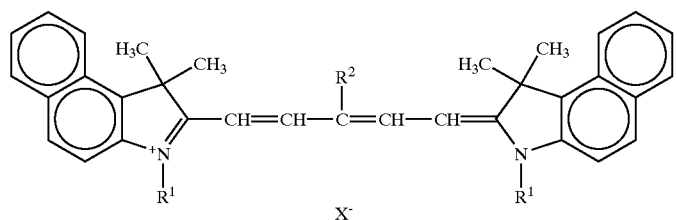
| No. | R¹ | R² | X⁻ |
|---|---|---|---|
| I-3 | CH₃ | CH₃ | ½ (naphthalene-1,5-disulfonate) |
| I-4 | CH₃ | CH₃ | ½ (2,7-dihydroxynaphthalene-3,6-disulfonate) |
| I-5 | CH₃ | CH₃ | ½ (4-hydroxynaphthalene-2,7-disulfonate) |
| I-6 | CH₃ | Cl | ½ (naphthalene-1,5-disulfonate) |
| I-7 | CH₃ | Br | ½ (naphthalene-1,5-disulfonate) |
| I-8 | CH₃ | H | BF₄⁻ |
| I-9 | CH₃ | CH₃ | BF₄⁻ |
| I-10 | n-C₄H₉ | H | BF₄⁻ |
| I-11 | n-C₄H₉ | H | ClO₄⁻ |
| I-12 | n-C₄H₉ | CH₃ | ClO₄⁻ |

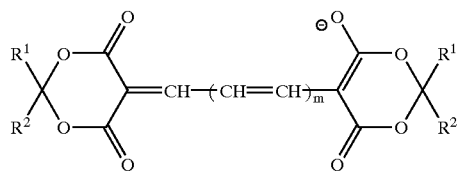

| No. | $R^1$ | $R^2$ | m |
|---|---|---|---|
| A-57 | $CH_3$ | $C_2H_5$ | 3 |
| A-58 | $CH_3$ | (4-methylphenyl) | 2 |
| A-59 | $C_2H_5$ | $CH(CH_3)_2$ | 2 |
| A-60 | $CH_3$ | $CH(CH_3)_2$ | 3 |
| A-61 | $CH_3$ | $C(CH_3)_3$ | 3 |
| A-62 | $CH_3$ | $C(CH_3)_3$ | 2 |
| A-63 | $CH_3$ | $CH_2CH(CH_3)_2$ | 2 |
| A-64 | $CH_3$ | (cyclohexylmethyl) | 3 |
| A-65 | $CH_3$ | $CH_2CH_2CH(CH_3)_2$ | 2 |
| A-66 | $C_2H_5$ | $n\text{-}C_7H_{15}$ | 2 |
| A-67 | $CH_3$ | $CH=C(CH_3)_2$ | 2 |
| A-68 | $CH_3$ | $CF_3$ | 2 |
| A-69 | $CH_3$ | $CH_2C(CH_3)_2OH$ | 2 |
| A-70 | $CH_3$ | $CH_2C(CH_3)_2OH$ | 3 |
| A-71 | $CH_3$ | $CH_2CH_2NHSO_2CH_3$ | 2 |

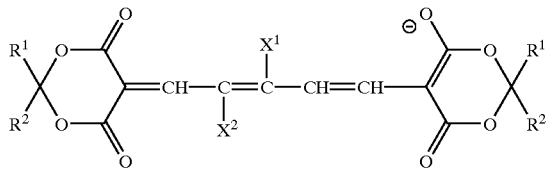

| No. | $R^1$ | $R^2$ | $X^1$ | $X^2$ |
|---|---|---|---|---|
| A-72 | $CH_3$ | $CH_3$ | $CH_3$ | H |
| A-73 | $CH_3$ | $CH_3$ | (phenyl) | H |
| A-74 | $CH_3$ | $CH_3$ | $OCH_3$ | H |
| A-75 | $CH_3$ | $CH(CH_3)_2$ | (phenoxy) | H |
| A-76 | $CH_3$ | $CH_3$ | (4-pyridyl) | H |
| A-77 | $CH_3$ | $CH_3$ | $C_2H_5$ | H |
| A-78 | $CH_3$ | $CH_3$ | (1-methyl-2-pyrrolidinon-yl) | H |

-continued
| | | | | |
|---|---|---|---|---|
| A-79 | CH₃ | CH₃ | Cl | H |
| A-80 | CH₃ | CH₃ | 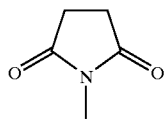 | H |
| A-81 | CH₃ | CH₃ | CH(CH₃)₂ | H |
| A-82 | CH₃ | CH₃ | H | CH₃ |
| A-83 | CH₃ | CH₃ | H | 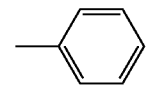 |
| A-84 | CH₃ | CH₃ | 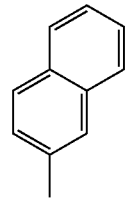 | H |
| A-85 | CH₃ | CH₃ | —CH₂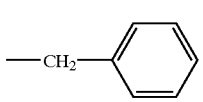 | H |
| A-86 | CH₃ | CH₂CO₂C₂H₅ | CH₃ | CH₃ |
A-87 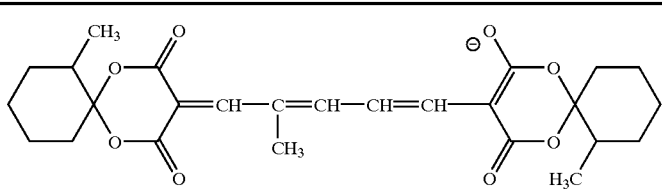
A-88 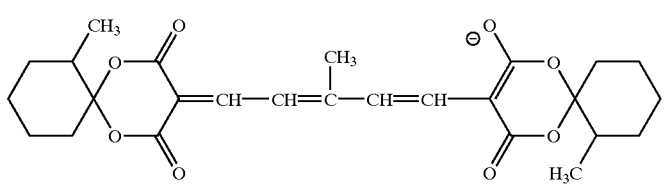
A-89 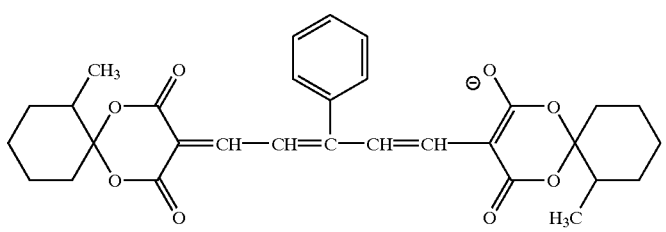
A-90 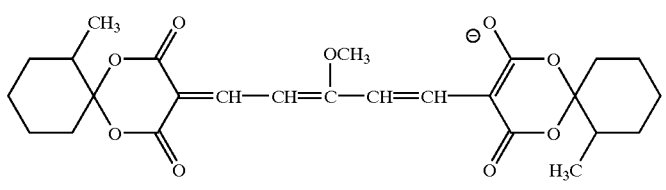

-continued

A-91 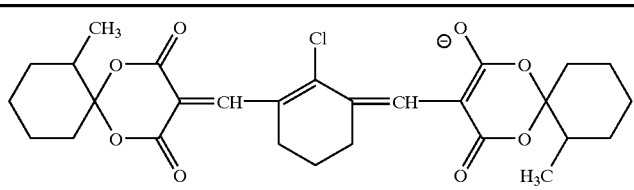

A-92 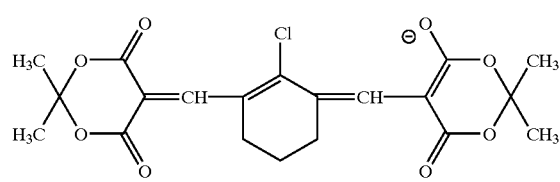

A-93 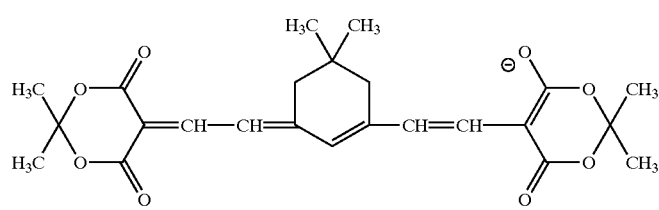

A-94 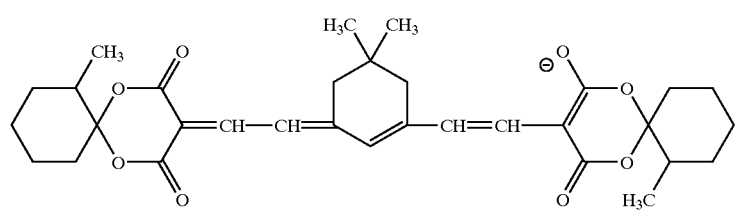

A-95 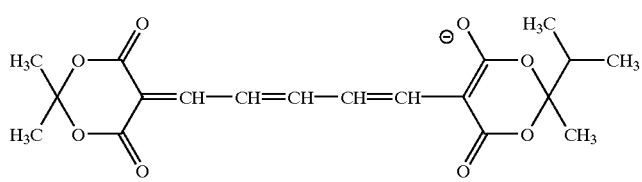

A-96 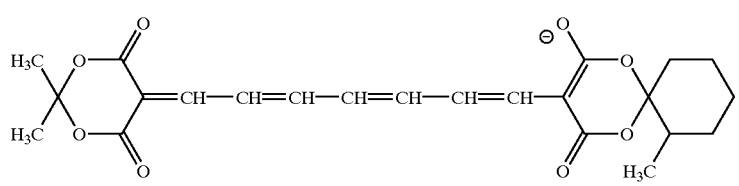

The cationic component (namely, cation part) is described below.

Examples of the cation parts represented by $V^{k+}$ include hydrogen ion, metal ions such as sodium ion, potassium ion, lithium ion, calcium ion, iron ion, and copper ion, ammonium ions, pyridinium ion, oxonium ions, sulfonium ions, phosphonium ions selenonium ion, and iodonium ion. $V^{k+}$ preferably is not a cyanine ion. Preferred is a quaternary ammonium ion.

The quaternary ammonium ion can be prepared by alkylation (Menshutkin reaction), alkenylation, alkynylation or arylation of a tertiary amine (e.g., trimethylamine, triethylamine, tributylamine, triethanolamine, N-methylpyrrolidine, N-methylpiperidine, N,N-dimethylpiperazine, triethylenediamine, or N,N,N',N'-tetramethylethylenediamine) or a compound having a nitrogen atom-containing heterocyclic ring such as a pyridine, picoline, 2,2'-bipyridyl, 4,4'-bipyridyl, 1,10-phenanthroline, quinoline, oxazole, thiazole, N-methylimidazole, pyrazine, or tetrazole).

The quaternary ammonium ion preferably has a nitrogen-containing heterocyclic group. Most preferred is a quaternary pyridinium ion.

k is an integer of 1 to 10, preferably 1 to 4. Most preferred is 2.

The quaternary ammonium ion preferably has the below-mentioned formula (V-1). This compound can be easily prepared by the Menshutkin reaction (see, for instance, Japanese Patent Provisional Publication No. 61-148162) or arylation (see, for instance, Japanese Patent Provisional Publications No. 51-16675 and No. 1-96171) of 2,2'-bipyridyl or 4,4'-bipyridyl with a halide having the desired substituent.

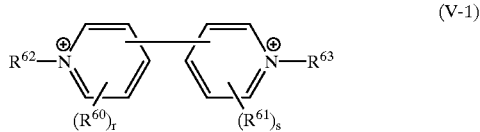

(V-1)

In the formula (V-1), each of $R^{60}$ and $R^{61}$ independently is a substituent, and each of $R^{62}$ and $R^{63}$ is alkyl, alkenyl, alkynyl, aralkyl, aryl, or a heterocyclic group. Each combination of $R^{60}$ and $R^{61}$, $R^{60}$ and $R^{62}$, and $R^{61}$ and $R^{63}$ may be combined with each other to form a ring. Each of r and s independently is an integer of 0 to 4. If any of r and s is 2 or more, plural numbers of $R^{60}$ and $R^{61}$ may be the same or different.

The alkyl group for $R^{62}$ and $R^{63}$ preferably is a straight chain, branched chain, or cyclic alkyl group having 1 to 18 carbon atoms, more preferably 1 to 8 carbon atoms, which may have one or more substituents. Examples are methyl, ethyl, n-propyl, isopropyl, n-butyl, isobutyl, t-butyl, neopentyl, n-hexyl, cyclopropyl, cyclohexyl, or adamantyl.

Examples of the substituents for the alkyl group are as follows (the following group may have one or more substituent groups include than alkenyl group having 2 to 18 carbon atoms, preferably 2 to 8 carbon atoms (e.g., vinyl); an alkynyl group having 2 to 18 carbon atoms, preferably 2 to 8 carbon atoms (e.g., ethynyl); an aryl group having 6 to 10 carbon atoms (e.g., phenyl and naphthyl); a halogen atom (e.g., F, Cl, or Br); an alkoxy group having 1 to 18 carbon atoms, preferably 1 to 8 carbon atoms (e.g., methoxy or ethoxy); an aryloxy group having 6 to 10 carbon atoms (e.g., phenoxy or p-methoxyphenoxy); an alkylthio group having 1 to 18 carbon atoms, preferably 1 to 8 carbon atoms (e.g., methylthio or ethylthio); an arylthio group having 6 to 10 carbon atoms (e.g., phenylthio); an acyl group having 2 to 18 carbon atoms, preferably 2 to 8 carbon atoms (e.g., acetyl or propionyl); an alkylsulfonyl group having 1 to 18 carbon atoms, preferably 1 to 8 carbon atoms (e.g., methanesulfonyl or p-toluenesulfonyl); an acyloxy group having 2 to 18 carbon atoms, preferably 2 to 8 carbon atoms (e.g., acetoxy or propionyloxy); an alkoxycarbonyl having 2 to 18 carbon atoms, preferably 2 to 8 carbon atoms (e.g., methoxycarbonyl or ethoxycarbonyl); an arylcarbonyl group having 7 to 11 carbon atoms (e.g., naphthoxycarbonyl); an amino group; a substituted amino group (e.g., methylamino, dimethylamino, diethylamino, anilino, methoxyphenylamino, chlorophenylamino, pyridylamino, methoxycarbonylamino, n-butoxycarbonylamino, phenoxycarbonylamino, methylcarbamoylamino, ethylthiocarbamoylamino, phenylcarbamoylamino, acetylamino, ethylcarbonylamino, ethylthiocarbamoylamino, cyclohexylcarbonylamino, benzoylamino, chloroacetylamino, or methylsulfonylamino); a carbamoyl group having 1 to 18 carbon atoms, preferably 1 to 8 carbon atoms (e.g., unsubstituted carbamoyl, methylcarbamoyl, ethylcarbamoyl, n-butylcarbamoyl, t-butylcarbamoyl, dimethylcarbamoyl, morpholinocarbamoyl, or pyrrolidinocarbamoyl); unsubstituted sulfamoyl group; a substituted carbamoyl group having 1 to 18 carbon atoms, preferably 1 to 8 carbon atoms (e.g., methylsulfamoyl, or phenylsulfamoyl); a cyano group; a nitoro group; a carboxy group; a hydroxyl group; a heterocyclic group (e.g., oxazole ring, benzoxazole ring, thiazol ring, benzothiazol ring, imidazole ring, benzoimidazole ring, indolenine ring, pyridine ring, piperidine ring, pyrrolidine ring, morpholine ring, sulforane ring, furan ring, thiophene ring, pyrazole ring, pyrrole ring, cumarone ring, or cumarin ring.

The alkenyl group for $R^{62}$ and $R^{63}$ preferably is an alkenyl group having 2 to 18 carbon atoms, preferably 2 to 8 carbon atoms, which may have one or more substituents, such as vinyl, allyl, 1-propenyl, or 1,3-butandienyl. The substituents for the alkenyl group can be the same as those described hereinbefore for the alkyl group.

The alkynyl group for $R^{62}$ and $R^{63}$ preferably is an alkynyl group having 2 to 18 carbon atoms, preferably 2 to 8 carbon atoms, which may have one or more substituents, such as ethynyl or 2-propynyl. The substituents for the alkynyl group can be the same as those described hereinbefore for the alkyl group.

The aralkyl group for $R^{62}$ and $R^{63}$ preferably is an aralkyl group having 7 to 18 carbon atoms, which may have one or more substituents, such as benzyl or methylbenzyl.

The aryl group for $R^{62}$ and $R^{63}$ preferably is an aryl group having 6 to 18 carbon atoms, which may have one or more substituents, such as phenyl or naphthyl. The substituents for the aryl group can be the same as those described hereinbefore for the alkyl group. Otherwise, the substituent may be an alkyl group such as methyl or ethyl.

The heterocyclic group for $R^{62}$ and $R^{63}$ preferably has a 5- or 6-membered saturated or unsaturated heterocyclic ring comprising carbon, nitrogen, oxygen and/or sulfur atom(s), such as oxazole ring, benzoxazole ring, thiazol ring, benzothiazol ring, imidazole ring, benzoimidazole ring, indolenine ring, pyridine ring, piperidine ring, pyrrolidine ring, morpholine ring, sulforane ring, furan ring, thiophene ring, pyrazole ring, pyrrole ring, cumarone ring, or cumarin ring. The heterocyclic ring may have one or more substituents. The substituents for the heterocyclic ring group can be the same as those described hereinbefore for the alkyl group.

The substituents for $R^{60}$ and $R^{61}$ can be the same as those described hereinbefore for the alkyl group. Otherwise, the substituent can be an alkyl group such as methyl or ethyl. The substituent for $R^{60}$ and $R^{61}$ preferably is hydrogen or an alkyl group. Hydrogen is most preferred.

The quaternary ammonium ion preferably has the following formula (V-1-A) or (V-1-B):

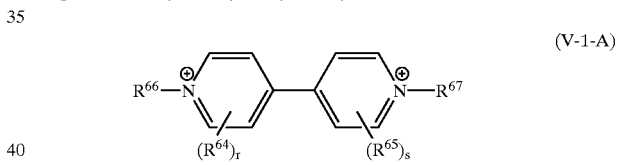

(V-1-A)

In the formula, $R^{64}$ and $R^{65}$ can be the same as the substituents described for $R^{60}$ and $R^{61}$ of the formula (V-1). $R^{66}$ and $R^{67}$ can be the same as the substituents described for $R^{62}$ and $R^{63}$ of the formula (V-1). Each of r and s is an integer of 0 to 4. If r or s is 2 or more, plural numbers of $R^{64}$ or $R^{65}$ can be the same or different;

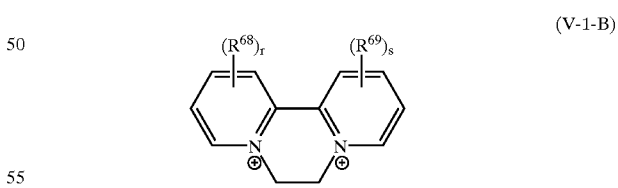

(V-1-B)

In the formula, $R^{68}$ and $R^{69}$ can be the same as the substituents described for $R^{60}$ and $R^{61}$ of the formula (V-1). $R^{68}$ and $R^{99}$ preferably are combined with each other to form a carbon ring or a heterocyclic ring, particularly, a condensed ring in combination with the pyridine rings to which $R^{68}$ and $R^{99}$ are attached. Each of r and s is an integer of 0 to 4. If r or s is 2 or more, plural numbers of $R^{68}$ or $R^{95}$ can be the same or different.

Representative examples of the cation parts of the oxonol dyes having the formula (IV-1) or (IV-2), including the formula (IV-2-A) are illustrated below:

B-1  ⊕N(CH₃)₄
B-2  ⊕N(C₂H₅)₄
B-3  ⊕N(C₄H₉⁽ⁿ⁾)₄
B-4 
B-5 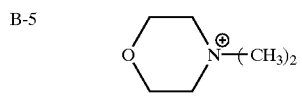
B-6 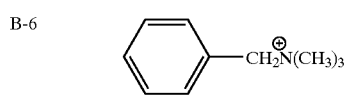
B-7 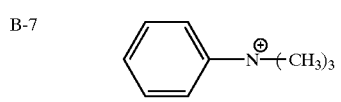
B-8 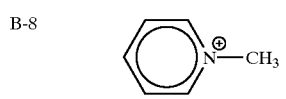
B-9 
B-10 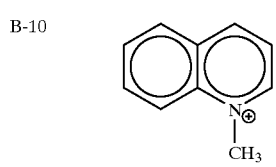
B-11 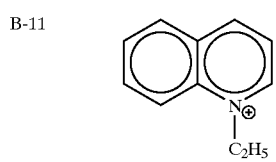
B-12 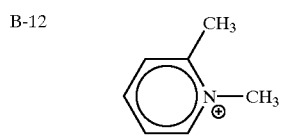
B-13 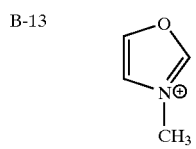
B-14 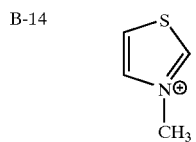

-continued

B-15 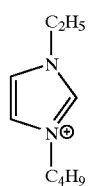

B-16 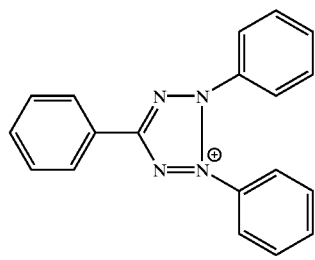

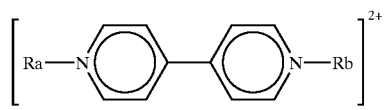

| No. | Ra | Rb |
|---|---|---|
| B-17 | CH$_3$ | CH$_3$ |
| B-18 | C$_2$H$_5$ | C$_2$H$_5$ |
| B-19 | n-C$_3$H$_7$ | n-C$_3$H$_7$ |
| B-20 | n-C$_4$H$_9$ | n-C$_4$H$_9$ |
| B-21 | iso-C$_4$H$_9$ | iso-C$_4$H$_9$ |
| B-22 | n-C$_6$H$_{13}$ | n-C$_6$H$_{13}$ |
| B-23 | C(CH$_3$)$_3$ | C(CH$_3$)$_3$ |
| B-24 | CH$_2$CH$_2$C(CH$_3$)$_3$ | CH$_2$CH$_2$C(CH$_3$)$_3$ |
| B-25 | CH$_2$=CH | CH$_2$=CH |
| B-26 | NCCH$_2$ | NCCH$_2$ |
| B-27 | C$_2$H$_5$O$_2$C—CH$_2$ | C$_2$H$_5$O$_2$C—CH$_2$ |
| B-28 | HOCH$_2$CH$_2$ | HOCH$_2$CH$_2$ |
| B-29 | C$_2$H$_5$OCH$_2$CH$_2$ | C$_2$H$_5$OCH$_2$CH$_2$ |
| B-30 | 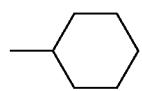 | 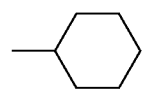 |
| B-31 | CH$_3$ | benzyl |
| B-32 | CH$_3$COCH$_2$ | CH$_3$COCH$_2$ |
| B-33 | adamantyl | adamantyl |
| B-34 | CF$_3$CH$_2$ | CF$_3$CH$_2$ |
| B-35 | phenyl | phenyl |
| B-36 | 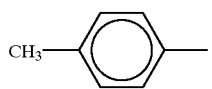 | 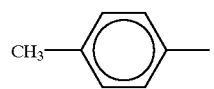 |
| B-37 | 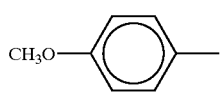 | 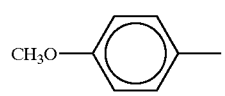 |
| B-38 | 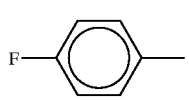 | 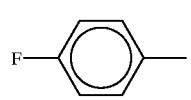 |
| B-39 | 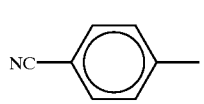 | 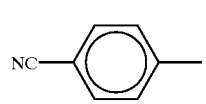 |

-continued

B-40: two 3-nitrotoluene (O₂N-phenyl-CH₃) structures

B-41: [(CH₃)₃N—CH₂—CH₂—N(CH₃)₃]²⁺

B-42: [(CH₃)₃N—(CH₂)₆—N(CH₃)₃]²⁺

B-43: [(CH₃)₃N—CH₂—CH₂—CH₂—O—CH₂—CH₂—O—CH₂—CH₂—CH₂—N(CH₃)₃]²⁺

B-44: [(CH₃)₃N—CH₂—CH₂—N(CH₃)₂—CH₂—CH₂—N(CH₃)₃]³⁺ (central N bearing two CH₃ groups)

B-45: [(C₄H₉)(CH₃)₂N—CH₂—CH₂—N(CH₃)₂(C₄H₉)]²⁺

B-46: [pyridinium-N—CH₂—CH₂—N-pyridinium]²⁺

B-47: [pyridinium-N—(CH₂)₆—N-pyridinium]²⁺

B-48: [pyridinium-N—CH₂—(p-phenylene)—CH₂—N-pyridinium]²⁺

B-49: [pyridinium-N—CH=CH—N-pyridinium]²⁺

B-50: 1,1'-dimethyl-3,3'-dimethyl-2-methyl-bipyridinium²⁺ (N,N'-dimethyl bipyridinium with CH₃ substituents)

B-51: bipyridinium fused with ethylene bridge between N atoms, 2+

B-52: bipyridinium with ethylene bridge between N atoms and CH₃ groups at positions adjacent to N, 2+

-continued
B-53 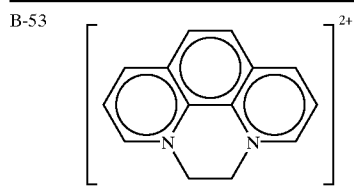
B-54 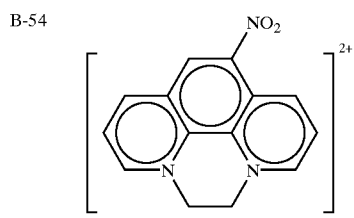
B-55 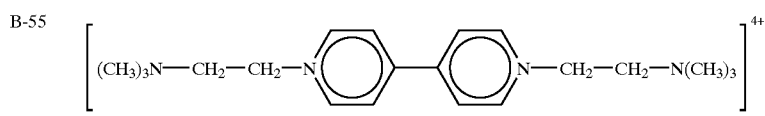
B-56 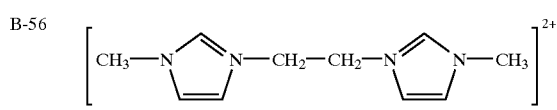
B-57 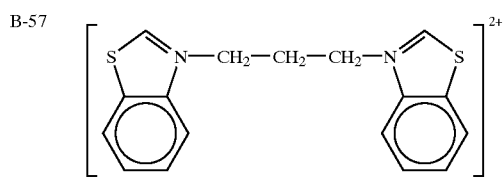
B-58 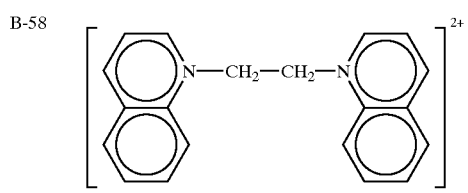
B-59 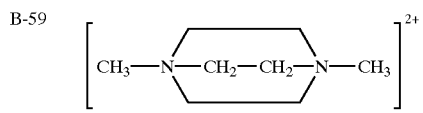
B-60 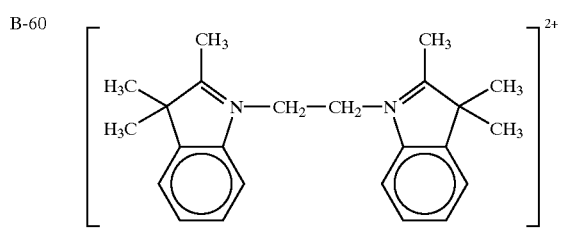
B-61 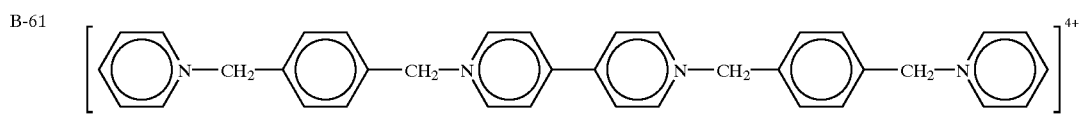
B-62 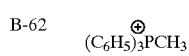
B-63 

-continued
B-64 $(C_6H_5)_4P^\oplus$
B-65 $(C_4H_9)_4P^\oplus$
B-66 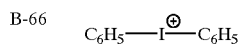
B-67 $(CH_3)_3S^\oplus$
B-68 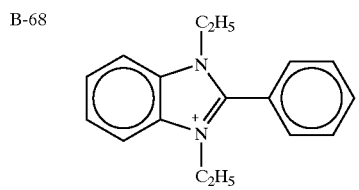
B-69 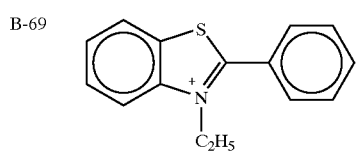
B-70 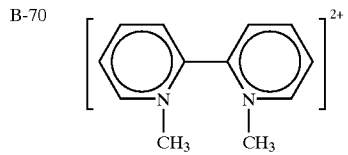
B-71 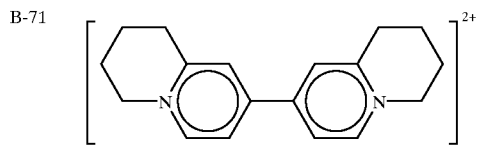
B-72 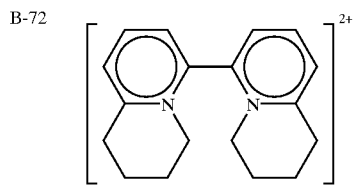
B-73 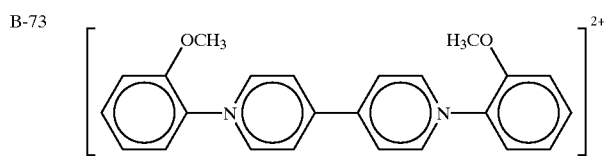
B-74 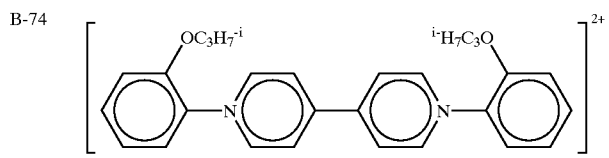
B-75 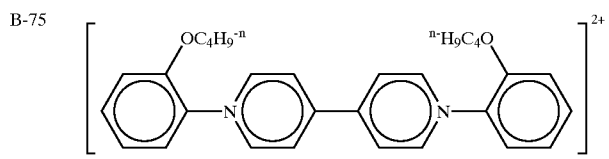

-continued
B-76 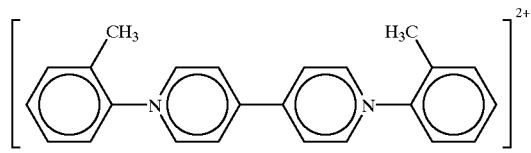
B-77 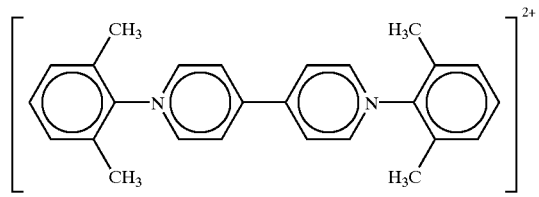
B-78 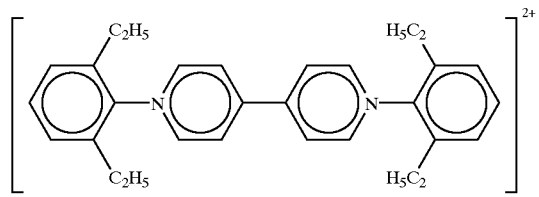
B-79 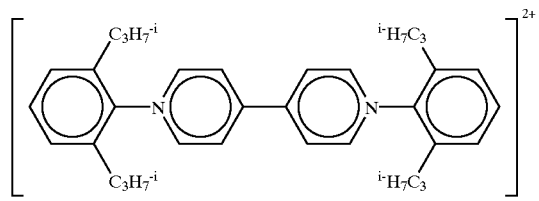
B-80 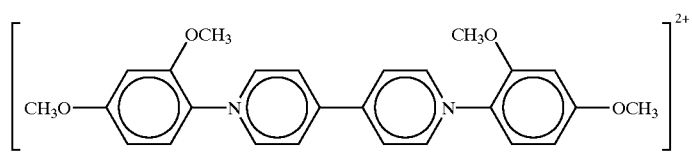
B-81 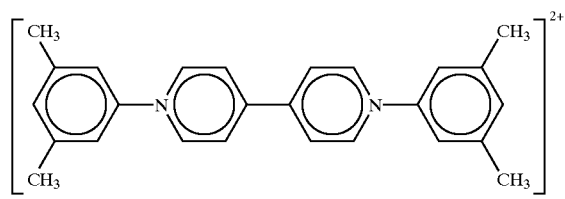
B-82 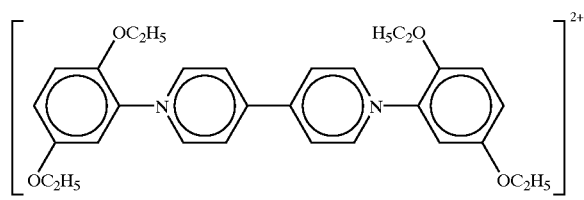
B-83 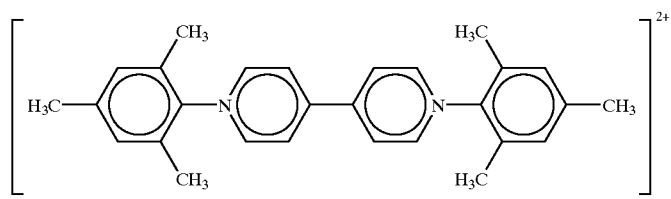

-continued
B-84 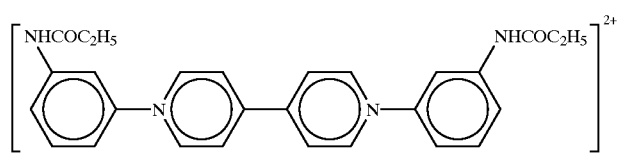
B-85 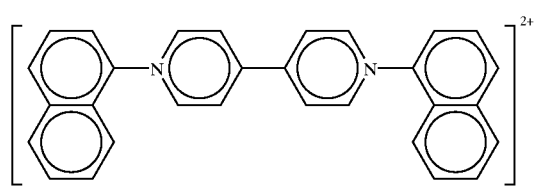
B-86 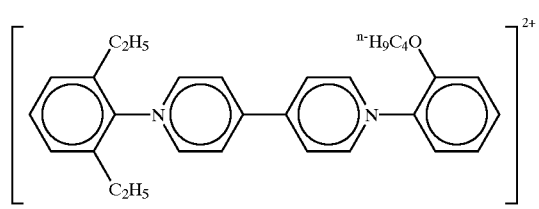
B-87 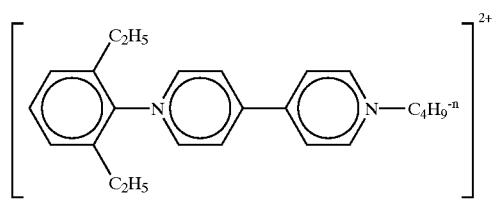
B-88 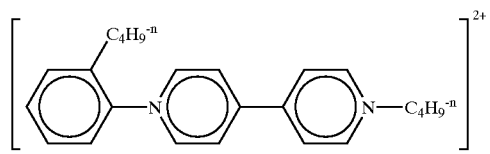
B-89 H⁺
B-90 Li⁺
B-91 Na⁺
B-92 K⁺
B-93 Cu²⁺
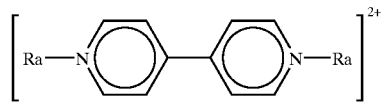
| No. | Ra |
|---|---|
| B-94 | iso-$C_5H_{11}$ |
| B-95 | $CH_3CH_2CH_2CH_2CHCH_2$<br>$\quad\quad\quad\quad\quad\quad\ \ \|$<br>$\quad\quad\quad\quad\quad\quad\ C_2H_5$ |
| B-96 | 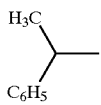 |
| B-97 | $C_6H_5CH_2CH_2$ |

-continued
| | |
|---|---|
| B-98 | 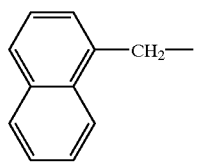 |
| B-99 | 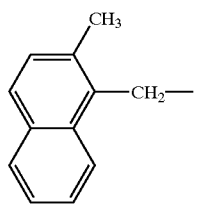 |
| B-100 | 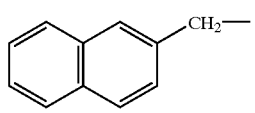 |
| B-101 | 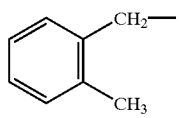 |
| B-102 | 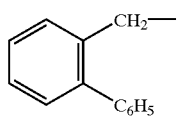 |
| B-103 | $CH_2=CH-CH_2$ |
| B-104 | 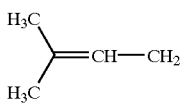 |
| B-105 | 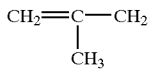 |
| B-106 | $(C_6H_5)_3C$ |
| B-107 | 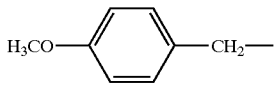 |
| B-108 | $CH≡C-CH_2$ |
| B-109 | $CH_3SO_2CH_2CH_2$ |
| B-110 | 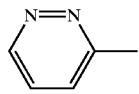 |
| B-111 | 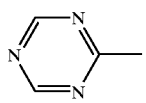 |

-continued $$\left[ Ra-N\underset{}{\overset{}{\bigcirc}}-\underset{}{\overset{}{\bigcirc}}N-Rb \right]^{2+}$$

| No. | Ra | Rb |
|---|---|---|
| B-112 | 4,6-diamino-1,3,5-triazin-2-yl-methyl | 4,6-diamino-1,3,5-triazin-2-yl-methyl |
| B-113 | pyrimidin-2-yl-methyl | pyrimidin-2-yl-methyl |
| B-114 | furan-2-yl-CH$_2$— | furan-2-yl-CH$_2$— |
| B-115 | 2,4-dinitrophenyl-methyl | 2,4-dinitrophenyl-methyl |
| B-116 | benzothiazol-2-yl-methyl | benzothiazol-2-yl-methyl |
| B-117 | pyridin-2-yl-methyl | pyridin-2-yl-methyl |
| B-118 | iso-C$_4$H$_9$ | benzyl |

B-119  NH$_4^+$

B-120  H$_3$N$^+$—CH$_3$

B-121  H$_3$N$^+$—C$_2$H$_5$

B-122  H$_2$N$^+$(C$_2$H$_5$)$_2$

B-123  N$^+$(C$_2$H$_5$)$_4$... H(C$_2$H$_5$)$_3$N$^+$

| | |
|---|---|
| B-124 | 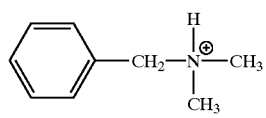 |
| B-125 | 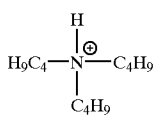 |
| B-126 | 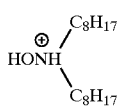 |
| B-127 | 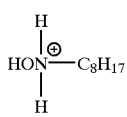 |
| B-128 | 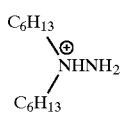 |
| B-129 | 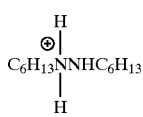 |
| B-130 | 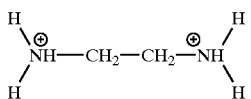 |
| B-131 | 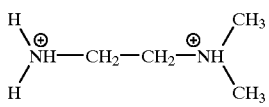 |
| B-132 | 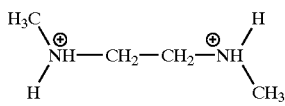 |
| B-133 | 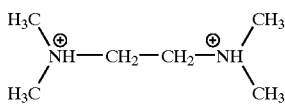 |
| B-134 | 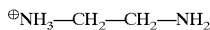 |
| B-135 | 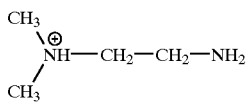 |
| B-136 | 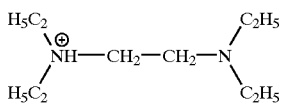 |
| B-137 | 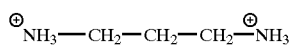 |

-continued
B-138 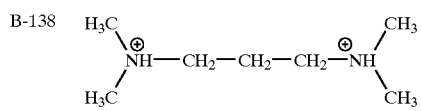
B-139 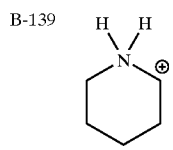
B-140 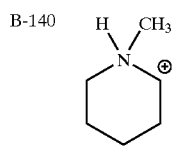
B-141 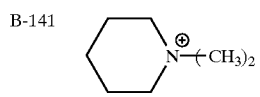
B-142 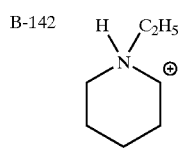
B-143 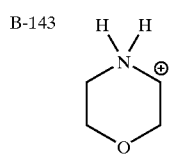
B-144 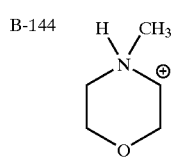
B-145 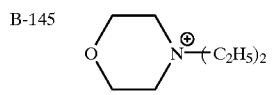
B-146 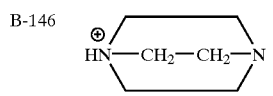
B-147 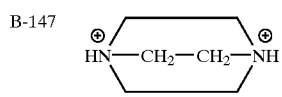
B-148 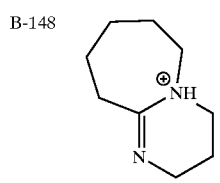

-continued
B-149 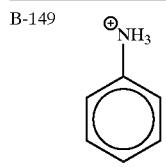
B-150 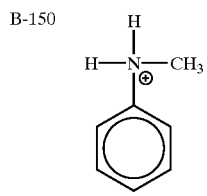
B-151 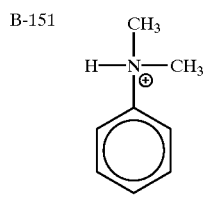
B-152 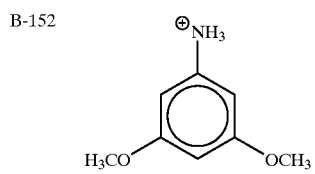
B-153 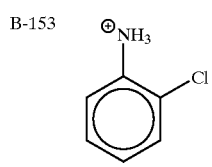
B-154 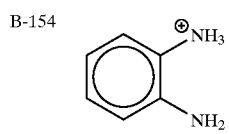
B-155 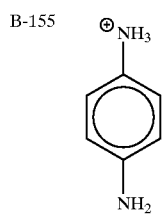
B-156 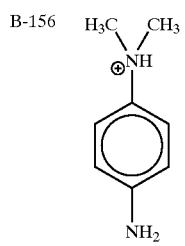
B-157 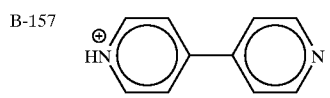

B-158 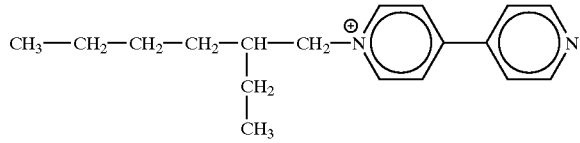

B-159 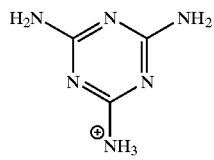

B-160 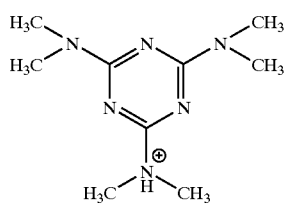

B-161 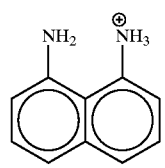

B-162 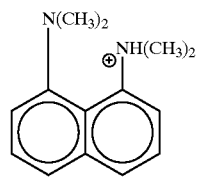

B-163 $Zn^{2+}$
B-164 $Ca^{2+}$
B-165 $Fe^{2+}$
B-166 $Cs^+$
B-167 $Ni^{2+}$

B-168 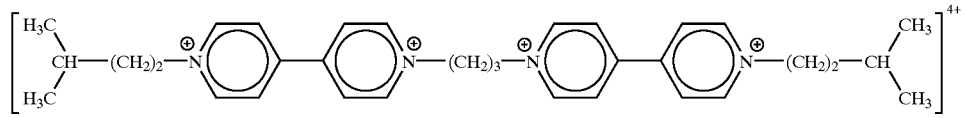

B-169 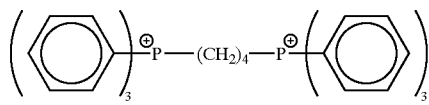

Representative examples of the oxonol dyes having the formula (IV-1) or (IV-2), including the formula (IV-2-A) are illustrated in the following Tables 1(1) and 1(2), in which the dye compound (identified by the dye number) is expressed by the combination of an anion part (A-) and a cation part (B-). For instance, the dye compound of the dye number 1 which is formed of the anion part of A-4 and the cation part of B-21 has the following formula:

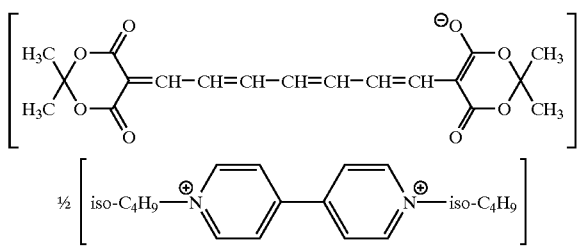

TABLE 1

| Dye No. | Anion | Cation | Dye No. | Anion | Cation |
|---|---|---|---|---|---|
| 1 | A-4 | B-21 | 2 | A-4 | B-77 |
| 3 | A-4 | B-123 | 4 | A-5 | B-21 |
| 5 | A-5 | B-78 | 6 | A-6 | B-22 |
| 7 | A-7 | B-22 | 8 | A-10 | B-78 |
| 9 | A-10 | B-117 | 10 | A-5 | B-123 |
| 11 | A-11 | B-85 | 12 | A-14 | B-21 |
| 13 | A-14 | B-77 | 14 | A-14 | B-113 |
| 15 | A-15 | B-1 | 16 | A-15 | B-148 |
| 17 | A-15 | B-168 | 18 | A-21 | B-15 |
| 19 | A-21 | B-103 | 20 | A-23 | B-74 |
| 21 | A-24 | B-78 | 22 | A-25 | B-78 |
| 23 | A-28 | B-78 | 24 | A-33 | B-30 |
| 25 | A-33 | B-51 | 26 | A-34 | B-78 |
| 27 | A-36 | B-21 | 28 | A-36 | B-78 |
| 29 | A-36 | B-87 | 30 | A-37 | B-21 |
| 31 | A-37 | B-41 | 32 | A-37 | B-78 |
| 33 | A-37 | B-113 | 34 | A-37 | B-117 |
| 35 | A-38 | B-117 | 36 | A-38 | B-133 |
| 37 | A-38 | B-85 | 38 | A-39 | B-23 |
| 39 | A-39 | B-33 | 40 | A-39 | B-55 |
| 41 | A-39 | B-78 | 42 | A-39 | B-85 |
| 43 | A-39 | B-117 | 44 | A-39 | B-123 |
| 45 | A-39 | B-168 | 46 | A-40 | B-21 |
| 47 | A-40 | B-55 | 48 | A-40 | B-78 |
| 49 | A-40 | B-85 | 50 | A-40 | B-89 |
| 51 | A-40 | B-113 | 52 | A-40 | B-117 |
| 53 | A-40 | B-168 | 54 | A-41 | B-21 |
| 55 | A-44 | B-33 | 56 | A-44 | B-50 |
| 57 | A-44 | B-78 | 58 | A-44 | B-94 |
| 59 | A-44 | B-98 | 60 | A-44 | B-117 |
| 61 | A-44 | B-132 | 62 | A-45 | B-21 |
| 63 | A-45 | B-53 | 64 | A-48 | B-24 |
| 65 | A-48 | B-33 | 66 | A-48 | B-55 |
| 67 | A-48 | B-84 | 68 | A-48 | B-110 |
| 69 | A-48 | B-117 | 70 | A-49 | B-78 |
| 71 | A-49 | B-94 | 72 | A-49 | B-115 |
| 73 | A-49 | B-117 | 74 | A-50 | B-78 |
| 75 | A-55 | B-18 | 76 | A-55 | B-82 |
| 77 | A-55 | B-114 | 78 | A-57 | B-78 |
| 79 | A-58 | B-78 | 80 | A-60 | B-33 |
| 81 | A-60 | B-78 | 82 | A-60 | B-117 |
| 83 | A-61 | B-17 | 84 | A-61 | B-79 |
| 85 | A-64 | B-27 | 86 | A-64 | B-77 |
| 87 | A-69 | B-78 | 88 | A-69 | B-117 |
| 89 | A-70 | B-26 | 90 | A-70 | B-76 |
| 91 | A-72 | B-77 | 92 | A-73 | B-77 |
| 93 | A-73 | B-94 | 94 | A-74 | B-24 |
| 95 | A-74 | B-78 | 96 | A-82 | B-78 |
| 97 | A-93 | B-21 | 98 | A-93 | B-78 |
| 99 | A-94 | B-78 | 100 | A-96 | B-78 |
| 101 | A-5 | B-24 | | | |

The oxonol dyes of the formula (IV-1) or (IV-2) can be prepared by the preparation process described in Japanese Patent Provisional Publication 10-297103.

According to the present invention, the dye is dissolved in a solvent comprising a fluorinated cyclic alkane or alkene, so as to form a dye solution for the preparation of the recording dye layer.

The fluorinated cyclic alkane or alkene preferably is a 4- to 6-membered fluorinated cyclic alkane or alkene, and more preferably a 5-members fluorinated cyclic alkane or alkene. Preferably, the fluorinated cyclic alkane or alkene is substituted with fluorine in an amount of 0.5 to 2.0 (more preferably 1.0 to 2.0, further preferably 1.0 to 1.8, most preferably 1.2 to 1.6) times the number of carbon atoms in the skeleton. Examples of the fluorinated cyclic alkanes include 1,1,2,2,3-pentafluorocyclobutane, 1,1,2,2,3,3-hexafluorocyclopentane, 1,1,2,2 3,3,4-heptafluorocyclopentane, 1,1,2,2,3,4,5-heptafluorocyclopentane, 1,1,2,2,3,3,4,4-octafluorocyclopentane, 1, 1,2,2,3,3,4,5-octafluorocyclopentane and 1,1,2,2,3,3,4,4,5-nonafluorocyclohexane. Examples of the fluorinated cyclic alkenes include 1,1,2,2,3,4-hexafluorocyclobutene, 1,1,2,2,3,3,4,5-octabfluorocyclopentene and 1,1,2,2,3,3,4,4,5,6-decafluorocyclohexene. These compounds are disclosed in Japanese Patent Provisional Publication Nos. 10-316596, 10-316597, 10-316598, 8-12603, 8-143487 and 9-95458.

Preferred examples of the fluorinated cyclic alkane or alkenes include 1,1,2,2,3,3,4-heptafluorocyclopentane, 1,1,2,2,3,4,5-heptafluorocyclopentane, 1,1,2,2,3,3,4,4-octafluorocyclopentane and 1, 1,2,2,3,3,4,5-octafluorocyclopentane. Particularly preferred is 1,1,2,2,3,3,4-heptafluorocyclopentane.

The solvent may consist essentially of a fluorinated cyclic alkane or alkene. Most of the laser light-sensitive dyes described in detail hereinbefore can be soluble in the fluorinated cyclic alkane or alkene. However, the solubility is not high, and the dissolving rate is not high. Therefore, if the fluorinated cyclic alkane or alkene is employed alone as the solvent for a laser light-sensitive dye, the dye solution is preferably prepared by the steps of mixing the organic dye and the solvent and keeping the resulting mixture at a temperature of higher than 45° C. but lower than a boiling temperature of the solvent by at least 10° C. for a period of 5 minutes to 2 hours.

The dye-dissolving steps of the above-mentioned procedure is further described.

In the first step, a laser light-sensitive dye is added to a solvent containing a fluorinated cyclic alkane or alkene so as to prepare a dye-solvent mixture. The mixture of the dye and solvent is preferably prepared by adding the dye in the solvent at room temperature (25° C.).

In the second step, the mixture is kept at a temperature of not lower than 45° C. and below the boiling point of the solvent by 5° C. or more for 5 minutes to 2 hours so as to prepare a dye solution. The mixture is preferably kept at a temperature of not lower than 50° C. (more preferably not lower than 55° C., further preferably not lower than 60° C.) and below the boiling point of the solvent by 10° C. or more (more preferably by 15° C. or more, further preferably by 20° C. or more). If the temperature is too high, the dye may deteriorate and the solvent often evaporates too much. The temperature is preferably kept in the aforementioned range for 10 to 90 minutes, more preferably 15 to 75 minutes. During this period, the dye is dissolved in the solvent enough to prepare a dye solution appropriately employable for the coating.

In order to promote dissolution of the dye in the solvent, it is preferred that stirring or vibration should be applied to the mixture with a proper means while the mixture is kept at a temperature in the aforementioned range. Examples of the means for stirring or vibration include a means for ultrasonic wave and a magnetic stirrer. Preferred is a means for ultrasonic wave.

The dye solution is preferably prepared in a container having a lid to efficiently keep the solvent from evaporation.

A container equipped with a high pressure proof lid (e.g., a pressure container) is advantageously used. However, it is generally dangerous and difficult to use a pressure container. In consideration of this, a container having a lid provided with a hole for releasing vapor is preferably used. In this case, for reducing the amount of released vapor, an upright container is preferably used so that the surface of the dye/solvent mixture in the container may be small. A preferred example of that container is a container whose upper part has a small cross section. When the dye/solvent mixture is heated to a high temperature, the dye is liable to deteriorate. Since the dye is further liable to deteriorate in the presence of oxygen, the air in contact with the mixture may be made to contain oxygen in as small an amount as possible. The amount of oxygen preferably is less than 15%, more preferably less than 10%, further preferably less than 5%, most preferably less than 1%.

The dye solution is preferably adjusted to have a concentration in a specific range because the concentration affects the coating properties. For example, during the preparation of the dye solution, the amount of evaporated solvent is measured, and according to that the solvent is additionally supplemented. The solvent is preferably supplemented in several portions, and the portions are preferably added at a specific temperature. Preferably, they are supplemented approx. at room temperature (20 to 30° C., more preferably 22 to 28° C.). If the amount of evaporated solvent is too much, the dye solution is so concentrated that insoluble nuclei of the dye may be produced. The amount of evaporated solvent, therefore, is preferably controlled to be not more than 30%, more preferably not more than 20%, further preferably not more than 10% based on the initial volume.

The fluorinated cyclic alkane or alkene is advantageously employed in a combination with an organic liquid which has a boiling point higher than that of the fluorinated cyclic alkane or alkene, which is essentially inert to the substrate, and in which the dye is soluble, in a volume ratio of 99:1 to 51:49 (alkane or alkene:organic liquid). The range of volume ratio preferably is 95:5 to 70:30, more preferably 90:10 to 80:20. The organic liquid preferably has a boiling point of lower than 250° C. (preferably lower than 200° C., more preferably lower than 180° C.) but higher than that of the fluorinated cyclic alkane or alkene by at least 10° C. (preferably at least 15° C., more preferably at least 20° C.).

Examples of such high-boiling point solvents include aliphatic ketone, an aliphatic hydrocarbon, an alicyclic hydrocarbon, a carboxylic acid ester, an aliphatic ether, and an alcohol. The alcohol preferably is aliphatic alcohol, alicyclic alcohol, aromatic alcohol, fluorinated alcohol, alkoxyalcohol, or ketoalcohol. The high-boiling solvent can be employed singly or in combination.

Examples of the high-boiling point solvents are described below: an aliphatic ketone having 4 to 12 carbon atoms (e.g.; t-butylmethylketone and disobutyl-ketone); an aliphatic hydrocarbon having 5 to 10 carbon atoms (e.g., hexane, heptane, octane, nonane, and decane); an alicyclic hydrocarbon having 6 to 12 carbon atoms (e.g., cyclohexane, methylcyclohexane, dimethylcyclohexane, ethylcyclohexane, isopropylcyclohexane, t-butylcyclohexane, and cyclooctane); a carboxylic acid ester having 5 to 10 carbon atoms (e.g., isopropyl acetate, t-butyl acetate, isobutyl propionate, t-butyl propionate, ethyl pivalate, methyl lactate, ethyl lactate, isopropyl isovalate, and isobutyl isovalate); an aliphatic ether having 6 to 10 carbon atoms (e.g., diisopropyl ether and diisobutyl ether); a saturated aliphatic alcohol having 1 to 12 carbon atoms (e.g., methyl alcohol, ethyl alcohol, n-propylalcohol, iso-propyl alcohol, butyl alcohol, isobutyl alcohol, sec-butyl alcohol, t-butyl alcohol, 3-methyl-2-butanol, 2-ethylbutanol, 2-methyl-1-butanol, pentanol, t-pentyl alcohol, 3-methyl-1-pentyl-3-ol, 4-methyl-2-pentanol, 2,4-pentanediol n-hexanol, 2-ethylhexanol, n-heptanol, 2-heptanol, 3-heptanol, n-octanol, and 2octanol); an unsaturated aliphatic alcohol having 3 to 6 carbon atoms (e.g., allyl alcohol, propargyl alcohol, and 3-methyl-1-butyn-3-ol); an alicyclic alcohol having 5 to 8 carbon atoms (e.g., cyclopentanol, cyclohexanol, 2-methylcyclohexanol, 3-methylcyclohexanol, and 4-methylcyclohexanol); an aromatic alcohol having 7 to 10 carbon atoms (e.g., benzyl alcohol); a ketoalcohol having 3 to 8 carbon atoms (e.g., diacetone alcohol, 1-hydroxy-2-propanone, and 3-hydroxy-3-methyl-2-butanone); a monovalent or divalent fluorinated alcohol having 1 to 12 carbon atoms (e.g. 2,2-difluoro-1ethanol, 2,2,2-trifluoro-1-ethanol, 1,3-difluoro-2-propanol, 2,2,3,3-tetrafluoro-1-propanol, 1,1,1,3,3,3-hexafluoro-2-propanol, 2,2,3,4,4,4-hexafluoro-1-butanol, 2,2,3,3,4,4,5,5-octafluoro-1-pentanol, 3,3-difluoro-1,2-heptanediol, 4-(trifluoromethyl)benzyl alcohol, and 2,6-difluoro-α-methylbenzyl alcohol); an alkoxyalcohol having 3 to 12 carbon atoms (e.g., ethylene glycol monomethyl ether (methylcellosolve and methoxyethanol), ethylene glycol monoethyl ether (ethylcellosolve and ethoxyethanol), ethylene glycol monoisopropyl ether, ethylene glycol monobuty ether (butylcellosolve), ethylene glycol dimethyl ether, ethylene glycol diethyl ether, ethylene glycol dibutyl ether, ethylene glycol diglycidyl ether, ethylene glycol dimethyl ether, 1-ethoxy-2-propanol, 1-methoxy-2-propanol, 2-isopropoxy-1-ethanol, 1-methoxy-2-butanol, 3-methoxy-1-butanol, 4-methoxy-1-butanol, and 2- (2-methoxyethoxy) ethanol.

Preferred high-boiling point solvents are aliphatic ketones (e.g., t-butyl methyl ketone and di-isobutyl ketone), aliphatic hydrocarbons (e.g., heptane, octane, and nonane), saturated aliphatic alcohols (e.g., n-propyl alcohol, butyl alcohol, isobutyl alcohol, sec-butyl alcohol, 3-methyl-2-butanol, 2-ethylbutanol, 2-methyl-1-butanol, pentanol, 3-methyl-1-pentyl-3ol, 4-methyl-2-pentanol), saturated aliphatic alcohols (e.g., propargyl alcohol and 3-methyl-1-butyn-3-ol), ketoalcohols (e.g., diacetone alcohol), fluorinated alcohols (e.g., 2,2,3,3-tetrafluoro-1propranol, 2,2,3,3,4,4,5,5-octafluoro-1-pentanol; and alkoxyalcohols (e.g., ethylene glycol monoethyl ether, ethylene glycol monoisopropyl ether, ethylene glycol monobutyl ether, ethylene glycol diglycidyl ether, and ethylene glycol diethyl ether).

Most preferred are fluorinated alcohols (e.g., 2,2,3,3-tetrafluoro-1-propanol) and ketoalcohols (e.g., acetone alcohol).

The fluorinated cyclic alkane or alkene is also employable for dissolving the laser-light sensitive dye in combination with an organic liquid which has a solubility for the dye higher than that of the fluorinated cyclic alkane or alkene and which is active to the substrate, in a volume ratio of 99.9:0.1 to 80:20 (preferably 99.7:0.3 to 88: 12, more preferably 99.5:0.5 to 92:8). The organic liquid preferably is a halogenated aliphatic hydrocarbon, an aromatic hydrocarbon, a ketone, a sulfoxide, an amide, a carboxylic acid ester, an ether, or a nitrile. The organic liquids can be employed singly or in combination.

The organic liquid which is employable in a small amount in combination with the fluorinated cyclic alkane or alkene is further described below in more detail.

The halogenated aliphatic hydrocarbon preferably has 1 to 6 carbon atoms. The halogen atom may be chlorine atom and bromine atom. Examples of the halogenated aliphatic hydrocarbons include dichloromethane, dichloroethane, trichloroethane; tetrachloroethane, 1,2,3-trichloropropane, 1,2-dibromopropane, 1-bromo-3-chloropropane, and 1,4-dichlorobutane.

The aromatic hydrocarbon preferably has a benzene nucleus and has 6 to 10 carbon atoms. Examples of the aromatic hydrocarbons include bromobenzene, dichlorobenzene, 1-bromo-4-fluorobenzene, toluene, 2-chloro-6-fluorotoluene, o-xylene, m-xylene, and 1,2,4-trimethylbenzene.

The ketone preferably has 2 to 10 carbon atoms and man be in the cyclic form. Examples of the ketones include acetone, 2,4-pentanedione, 3-heptanone, 4-heptanone, 2,6-dimethyl-4-heptanone, diisopropyl ketone, 2-methylbutyl ethyl ketone, cyclohexanone, 2-methylcyclohexanone, 3-methylcyclohexanone, and 4-methylcyclohexaneone.

The sulfoxide preferably has 2 to 10 carbon atoms, and preferably is dimethylsulfoxide.

The amide preferably has 1 to 10 carbon atoms, and may be in the cyclic form. Examples of the amides include N,N-dimethylformamide, N,N-dimethylacetamide, N,N-diethylformamide, N,N-dimethylpropionamide, and 1-methyl-2-pyrrolidone.

The carboxylic acid ester preferably has 3 to 10 carbon atoms. Examples of the carboxylic acid esters include methyl acetate, ethyl acetate, ethyl trichloroacetate, n-butyl acetate, isobutyl acetate, sec-butyl acetate, t-butyl acetate, amyl acetate, ethyl 3-chloropropionate, n-propyl propionate, n-butyl propionate, n-propyl butyrate, methyl isobutyrate, ethyl isobutyrate, n-propyl isobutyrate, methyl pivalate, ethyl glycolate, ethyl pyruvate, and t-butyl acetacetate.

The ether preferably has 2 to 10 carbon atoms, and may be in the cyclic form. Examples of the ethers include t-butoxy-2-ethoxy ether, butyl ether, propylene glycol methyl ether acetate, dioxane, anisole, 2,5-dimethoxy-2,5-dihydrofuran, 2,5-dimethoxytetrahydrofuran, 2-(bromomethyl)-tetrahydro-2H-pyrane, and 2-chloromethyl-1,3-dioxane. Dioxane is preferred.

The nitrile preferably has 1 to 6 carbon atoms. Examples of the nitriles include 3-bromopropionitrile, 3-ethoxypropylnitrile, and dimethylcarbamate nitrile (dimethylcyanamide).

Examples of the preferred organic liquids include aliphatic halogenated hydrocarbons (particularly, dichloromethane, dichloroethane, and tetrachloroethane), aromatic hydrocarbons (particularly, toluene, o-xylene, and m-xylene), ketones (particularly, acetone and cyclohexane), carboxylic acid esters (particularly, methyl acetate, ethyl acetate, and butyl acetate), and ethers (particularly dioxane).

The fluorinated cyclic alkane or alkene can be employed in combination with a fluorinated alcohol in a volume ratio of 50:50 to 1:99. In this case, the fluorinated cyclic alkane or alkene serves not only to dissolve the laser light-sensitive dye but also to accelerate evaporation of the fluorinated alcohol, so as to shorten the period for drying the coated dye solution. Examples of the fluorinated alcohols are those mentioned hereinbefore.

In the case that the fluorinated cyclic alkane or alkene is employed in combination with other solvents for the preparation of the dye solution, it is preferred that the dye solution is prepared by beforehand adding the dye to the fluorinated cyclic alkane or alkene or prepare a mixture, heating the mixture to dissolve the dye, and then adding other solvents to the mixture. Otherwise, the dye solution can be prepared by beforehand mixing the fluorinated cyclic alkane or alkene and other solvents to prepare a mixed solvent, adding the dye to the mixed solvent, and heating the mixture to dissolve the dye.

The dye solution may further contain auxiliary additives such as oxidation inhibitors, UV absorbers, plasticizers, and lubricants.

In the preparation of the dye solution, an anti-fading agent and, if needed, a binder can be incorporated. Examples of the anti-fading agents include nitroso compounds, metal complexes, diimmonium salts and aminium salts. These examples are described, for example, in Japanese Patent Provisional Publications No. 2-300288, No. 3-224793 and No. 4-146189. If the anti-fading agent is used, its amount is in the range of usually 0.1 to 50 wt. %, preferably 0.5 to 45 wt. %, further preferably 3 to 40 wt. %, particularly preferably 5 to 25 wt. % base on the amount of the dye.

Examples of the binders include natural-origin polymers such as gelatin, cellulose derivatives, dextran, rosin and rubber; hydrocarbon polymer resins such as polyethylene, polypropylene, polystyrene and polyisobutyrene; vinyl polymer such as polyvinyl chloride, polyvinylidene chloride and vinyl chloride-vinyl acetate copolymer; acrylate polymers such as polymethyl acrylate and polymethyl methacrylate; polyvinyl alcohol; chlorinated polyethylene; epoxy resins; butyral resins; rubber derivatives; and thermosetting resins such as prepolymers of phenol-formaldehyde. The binder is optionally employed so that the amount of the binder may be not more than 20 weight parts, preferably not more than 10 weight parts, further preferably not more than 5 weight parts based on 100 weight parts of the dye.

The thus-prepared coating liquid contains the dye in a concentration of generally 0.01 to 10 wt. %, preferably 0.1 to 5 wt. %.

The dye solution is then coated on the substrate disc.

The dye solution is coated on the substrate disc, while the temperature of the liquid preferably is not higher than 40° C., more preferably not higher than 35° C., further preferably 25 to 30° C. The coating can be performed by the known methods such as spray coat, spin coat, dip coat, roll coat, blade coat, doctor roller coat and screen print. Spin coat is preferred. The recording dye layer can be a single layer or can comprise plural layers. The thickness of the recording dye layer (after drying) generally is in the range of 20 to 500 nm, preferably 50 to 300 nm.

On the recording dye layer, the light-reflecting layer is generally placed so as to enhance the light-reflection in the course of reproduction of the recorded information. The light-reflecting material to be used for the formation of the light-reflecting layer should show a high reflection to the laser light. Examples of the light-reflecting materials include metals and submetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi. Stainless steel film is also employable. These materials can be employed singly, in combination or in the form of alloy. Preferred are Cr, Ni, Pt, Cu, Ag, Au, Al and stainless steel. Au metal, Ag metal, and their alloys are particularly preferred. Preferred alloys of Au or Ag are alloys with at least one metal selected from the group consisting of Pt, Cu and Al. Most preferred is Ag metal or an alloy of Ag. The light-reflecting layer can be formed on the recording dye layer, for example, by vacuum deposition, sputtering or ion-plating. The thickness of the light-reflecting layer generally is 10 to 800 nm, preferably 20 to 500 nm, further preferably 50 to 300 nm.

On the light-reflecting layer, a protective layer is generally provided so as to protect the recording dye layer and the light-reflecting layer from chemical deterioration or physical damage. The protective layer can be made of inorganic materials such as SiO, $SiO_2$, $MgF_2$, $SnO_2$, $Si_3N_4$; or organic materials such as thermo-plastic resins, thermo-setting resins and UV curable resins. On the light-reflecting layer and/or the substrate, the protective layer can be formed by laminating a film of plastic material using an adhesive. Otherwise, it can be also formed by vacuum deposition, sputtering or coating. The organic material protective layer can be formed by the steps of dissolving the polymer material to prepare a polymer solution, coating the polymer solution to form a layer, and then drying the formed layer to give the protective layer. In the case of a UV curable resin, neat resinous material having no solvent or a solution of the resin may be applied and then cured by applying ultraviolet rays to the formed layer. The polymer solution for protective layer can optionally contain various additives such as antistatic agents, oxidation inhibitors and UV absorbers. Besides on the light-reflecting layer, another protective layer can be also placed on the face not having the recording dye layer so as to enhance the scratch resistance and the moisture resistance of the medium. The thickness of the protective layer is generally in the range of 0.1 to 100 μm.

The recording/reproducing procedures with an optical disc of CD-R type are carried out, for example, in the following manner.

Using an optical disc of CD-R type, the information recording/reproducing can be carried out not only at a normal line rate (1.2 to 1.4 m/sec.) but also at a twofold line rate, a fourfold line rate and a sixfold or more line rate.

The optical disc is made to rotate at a predetermined line rate (1.2 to 1.4 m/sec., in the case of CD format), or a predetermined angular rate. On the rotating disc, a recording light source such as a semiconductor laser beam is applied through the transparent substrate. By the application of the laser beam, irradiated area of the recording layer is locally heated to change the physical or chemical characteristics, and thus pits are formed in the recording layer to record the information. The light source preferably is a semiconductor laser having an oscillation frequency in the range of 500 to 850 nm. The preferred beam wavelength is in the range of 500 to 800 nm. In the case of the optical disc of CD-R type, the laser beam preferably has a wavelength of 770 to 790 nm. The reproduction of the recorded information can be accomplished by applying a semiconductor laser beam on the optical disc rotating at a predetermined line rate. The light-reflection is then detected from the transparent substrate side.

The preparation of optical information recording medium of the invention is described above with respect to an optical disc of CD-R type, as an example. However, the invention can be also used for an optical disc of DVD-R type.

The present invention is further described by the following examples.

EXAMPLE 1

A container having a lid provided with a hole for releasing the vapor was prepared. The upper part of the container had a small cross section. In this container, a dye solution for recording layer was prepared in the following manner.

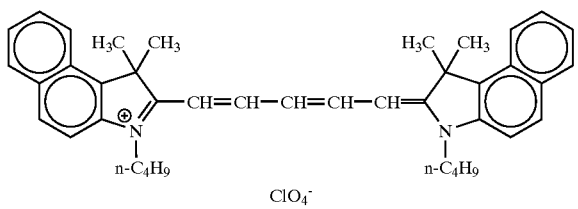

(1) Preparation of dye solution

Into the container, 1.5 g of an indolenine type cyanine dye shown above and 100 mL of 1,1,2,2,3,3,4-heptafluorocyclopentane [Zeorola H (trade name), available from Nippon Zeon Co. Ltd., boiling point: 82.5° C.] were introduced at room temperature (25° C.). The mixture was then heated for 10 minutes to 60° C. While the temperature was kept at 60° C., ultrasonic waves were applied for 1 hour to dissolve the dye. Thus, the dye solution for recording layer was prepared.

The dye solution was cooled to 25° C., and applied by spin-coat on the surface (on which pregroove was formed) of a polycarbonate substrate disc (outer diameter: 120 mm, inner diameter: 15 mm, thickness: 1.2 mm) and then dried to give a recording dye layer (thickness at the pregroove: approx. 180 nm). The pregroove was beforehand formed spirally on the substrate (track pitch: 1.6 μm, pregroove width: 500 nm, depth at pregroove: 175 nm) by injection molding.

On thus-formed dye layer, a light-reflecting layer made of Ag (thickness: about 150 nm) was provided by sputtering with DC magnetron sputtering apparatus. On thus-formed light-reflecting metal layer, a UV curable photopolymer (Daicureclear SD-318 [trade name], available from Dainippon Ink & Chemicals, Inc.) was further applied by spin-coat, and the irradiated with ultraviolet rays of a metal halide lamp to be cured to form a resin protective layer of about 8 μm thickness.

Thus, an optical disc of CD-R type (hereinafter simply referred to as "CD-R") comprising a substrate, a recording dye layer, a light-reflecting metal layer and a resin protective layer overlaid in order was produced according to the present invention.

EXAMPLES 2 TO 10

The procedure for the preparation of dye solution described in Example 1 was repeated except for replacing the dye with one of the cyanine or oxonol dyes set forth in Table 2, to prepare an optical disc.

TABLE 2

| Example No. | Dye (Dye No.) | Amount |
| --- | --- | --- |
| Example 2 | Cyanine dye (I-43) | 1.5 g |
| Example 3 | Cyanine dye (I-17) | 1.5 g |
| Example 4 | Cyanine dye (I-62) | 0.9 g |
|  | Cyanine dye (I-17) | 0.4 g |
|  | Cyanine dye (I-11) | 0.2 g |
| Example 5 | Cyanine dye (I-12) | 1.5 g |
| Example 6 | Cyanine dye (I-101) | 1.5 g |
| Example 7 | Cyanine dye (I-104) | 1.5 g |
| Example 8 | Cyanine dye (I-123) | 1.5 g |
| Example 9 | Cyanine dye (I-124) | 1.5 g |
| Example 10 | Oxonol dye (1 in Table 1) | 1.5 g |

Evaluation of Optical Disc

Onto the optical disc of Example 1, EFM signals were recorded with a laser beam of 780 nm through a NA 0.5 pick-up (line rate: 4.8 m/sec.) by means of OTM-2000 ([trade name], available from Pulstech) at the optimum power while the power varies in the range of 3 to 10 mW. The recorded signals were then reproduced with a laser beam of 780 nm through a NA0.45 pick-up (line rate: 1.2 m/sec.) by means of CD-CATS (trade name, available from Audio Development) at the laser power of 0.5 mW, and thereby 11T land jitter (jitter between pits) at the position 40 mm from the center position was measured by means of TIA (available from Hewlett Packard). A small jitter value indicates that the recorded signals are uniform.

The results are shown in Table 3.

TABLE 3

|  | 11T land jitter (ns) |
| --- | --- |
| Example 1 | 31 |

EXAMPLES 11 TO 14

The procedure for the preparation of dye solution described in Example 1 was repeated except for replacing the solvent with a combination of 1,1,2,2,3,3,4-heptafluorocyclopentane (HFCP) and dichloromethane (DCM, for Examples 11 to 13) in the ratio set forth in Table 4, or dichloroethane (DCE, for Example 14( in the ratio set forth in Table 4, to prepare an optical disc.

Evaluation of Optical Disc

The optical discs of Examples 11 to 14 were evaluated in the aforementioned manner with respect to 11T land jitter (jitter between pits) at the position 40 mm and 57 mm from the center position.

The results are shown in Table 4.

TABLE 4

| Example | Solvent mixture (vol. ratio) | 11T land jitter (ns) 40 mm | 11T land jitter (ns) 57 mm |
| --- | --- | --- | --- |
| Ex. 11 | HFCP/DCM (99/1) | 31 | 33 |
| Ex. 12 | HFCP/DCM (98/2) | 31 | 33 |
| Ex. 13 | HFCP/DCM (95/5) | 33 | 34 |
| Ex. 14 | HFCP/DCE (95/5) | 32 | 33 |

EXAMPLES 15 AND 16

The procedure for the preparation of dye solution described in Example 1 was repeated except for replacing the solvent with a combination of 1,1,2,2,3,3,4-heptafluorocyclopentane (HFCP) and 2,2,3,3-tetrafluoroalcohol (TFP, for Example 15) in the ratio set forth in Table 5, or diacetone alcohol (DAA, for Example 16) in the ratio set forth in Table 5, to prepare an optical disc.

COMPARISON EXAMPLE 1

The procedure for the preparation of dye solution described in Example 1 was repeated except for replacing the solvent with 2,2,3,3-tetrafluoroalcohol, to prepare an optical disc.

Evaluation of Optical Disc

The optical discs of Examples 15 and 16 as well as Comparison Example 1 were evaluated in the aforementioned manner with respect to 11T land jitter (jitter between pits) at the positions 40 mm and 57 mm from the center position.

The results are shown in Table 5.

TABLE 5

| Example | Solvent mixture (vol. ratio) | 11T land jitter (ns) 40 mm | 11T land jitter (ns) 57 mm |
| --- | --- | --- | --- |
| Ex. 15 | HFCP/TFP (90/10) | 30 | 31 |
| Ex. 16 | HFCP/DAA (95/5) | 31 | 32 |
| Com. 1 | TFP (100) | 36 | 41 |

EXAMPLES 17 TO 21

The procedure for the preparation of dye solution described in Example 1 was repeated except for replacing the solvent with a combination of 2,2,3,3-tetrafluoroalcohol (TFP) and 1,1,2,2,3,3,4-heptafluorocyclopentane (HFCP) in the ratio set forth in Table 6 in the ratio set forth in Table 5, to prepare an optical disc.

In the preparation, the time required for drying the coated dye solution was measured.

COMPARISON EXAMPLE 2

The procedure for the preparation of dye solution described in Example 1 was repeated except for replacing the solvent with 2,2,3,3-tetrafluoroalcohol, to prepare an optical disc.

In the preparation, the time required for drying the coated dye solution was measured.

Evaluation of Optical Dics

The optical discs of Examples 17 and 21 as well as Comparison Example 2 were evaluated in the aforementioned manner with respect to 11T land jitter (jitter between pits) at the positions 40 mm from the center position.

The results are shown in Table 6.

TABLE 6

| Example | Solvent (TFP/HFCP) (vol. ratio) | Time for Dryness (sec.) | 11T land jitter (ns) 40 mm |
| --- | --- | --- | --- |
| Ex. 17 | 95/5 | 13 | 32 |
| Ex. 18 | 85/15 | 11 | 32 |
| Ex. 19 | 75/25 | 10 | 31 |
| Ex. 20 | 65/35 | 9 | 32 |
| Ex. 21 | 55/45 | 8 | 34 |
| Com. 2 | TFP (100) | 16 | 34 |

What is claimed is:

1. A process for the preparation of an optical information recording disc comprising the steps of coating a dye solution on a transparent substrate disc and drying the coated dye solution, in which the dye solution is a solution of a laser-light sensitive organic dye dissolved in an organic solvent comprising 1,1,2,2,3,3,4-heptafluorocyclopentane, the laser-light sensitive organic dye being selected from the group consisting of a cyanine dye, and oxonol dye, and an azo dye.

2. The process of claim 1, wherein the solvent comprises 1,1,2,2,3,3,4-heptafluorocyclopentane and an organic liquid which has a boiling point higher than that of 1,1,2,2,3,3,4-heptafluorocyclopentane, which is essentially inert to the substrate, and in which the dye is soluble, in a volume ratio of 99:1 to 51:49.

3. The process of claim 2, wherein the organic liquid has a boiling point of lower than 250° C. but higher than that of 1,1,2,2,3,3,4-heptafluorocyclopentane by at least 10° C.

4. The process of claim 2, wherein the organic liquid is selected from the group consisting of an aliphatic ketone, an aliphatic hydrocarbon, an alicyclic hydrocarbon, a carboxylic acid ester, an aliphatic ether, and an alcohol.

5. The process of claim 2, wherein the organic liquid is a fluorinated alcohol having one of the formulas of $CF_3CH_2OH$, $HCF_2CF_2CH_2OH$, $H(CF_2CF_2)_2CH_2OH$, and $H(CF_2CF_2)_3CH_2OH$.

6. The process of claim 2, wherein the organic liquid is a ketoalcohol.

7. The process of claim 6, wherein the ketoalcohol is diacetone alcohol.

8. The process of claim 1, wherein the organic solvent comprises 1,1,2,2,3,3,4-heptafluorocyclopentane and an organic liquid which has a solubility for the dye higher than that of 1,1,2,2,3,3,4-heptafluorocyclopentane and which is active to the substrate, in a volume ratio of 99:9:0.1 to 80:20.

9. The process of claim 8, wherein the organic liquid is selected from the group consisting of a halogenated aliphatic hydrocarbon, an aromatic hydrocarbon, a ketone, a sulfoxide, an amide, a carboxylic acid ester, an ether, and a nitrile.

10. The process of claim 8, wherein the organic liquid is a halogenated aliphatic hydrocarbon selected from the group consisting of dichloromethane, dichloroethane, and tetrachloroethane.

11. The process of claim 8, wherein the organic liquid is acetone.

12. The process of claim 1, wherein the solvent comprises 1,1,2,2,3,3,4-heptafluorocyclopentane and a fluorinated alcohol in a volume ratio of 50:50 to 1:99.

13. The process of claim 12, wherein the fluorinated alcohol is 2,2,3,3-tetrafluoro-1-propanol.

14. The process of claim 1, wherein the organic dye is the cyanine dye having the following formula:

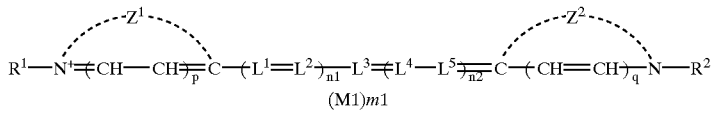

(M1)$m1$ wherein each of $Z^1$ and $Z^2$ independently is an atomic group required for forming a 5- or 6-membered nitrogen-containing heterocyclic ring; each of $R^1$ and $R^2$ independently is an alkyl group; each of $L^1$, $L^2$, $L^3$, $L^4$ and $L^5$ independently is a methine group which may have one or more substituents; each of n1 and n2 independently is 0, 1 or 2; each of p and q independently is 0 or 1; M1 is a charge-neutralizing counter ion; and m1 is a number of 0 or more which corresponds to an electron charge number required for neutralizing the cyanine dye.

15. The process of claim 14, wherein the cyanine dye has one of the following formulas:

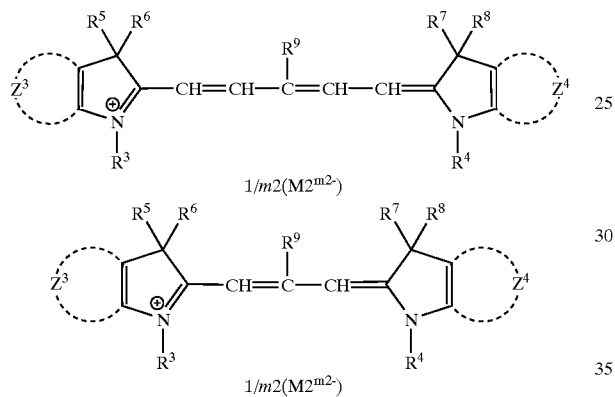

wherein each of $Z^3$ and $Z^4$ independently is an atomic group required for forming a benzene or naphthalene ring which may have one or more substituents; each of $R^3$, $R^4$, $R^5$, $R^6$, $R^7$ and $R^8$ independently is an alkyl group having 1 to 8 carbon atoms; $R^9$ is a hydrogen atom, an alkyl group having 1 to 8 carbon atoms, an aralkyl group having 7 to 10 carbon atoms, an aryl group having 6 to 10 carbon atoms, an alkoxy group having 1 to 8 carbon atoms, a heterocyclic ring, a halogen atom, or a carbamoyl group having 1 to 8 carbon atoms; and $M2^{m2-}$ is an anion, in which m2 is 1 or 2.

16. The process of claim 1, wherein the organic dye is a metal complex of the azo dye having the following formula:

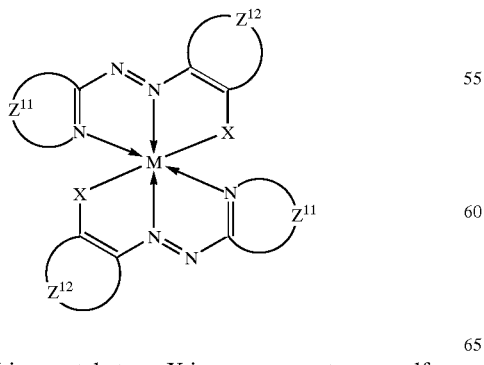

wherein M is a metal atom; X is an oxygen atom, a sulfur atom, or $=NR^{11}$ in which $R^{11}$ represents a hydrogen atom, an alkyl group, an aryl group, an acyl group, an alkylsulfonyl group, or an arylsulfonyl group; $Z^{11}$ is an atomic group required for forming a 5- or 6-membered nitrogen-containing heterocyclic ring; and $Z^{12}$ is an atomic group required for forming an aromatic ring or a heterocyclic aromatic ring.

17. The process of claim 16, wherein the metal complex of the azo dye has the following formula:

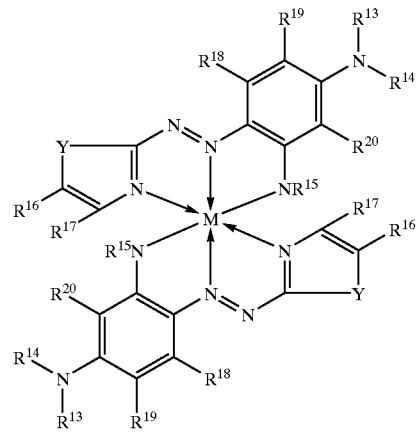

wherein M is a metal atom selected from the group consisting of iron, cobalt, nickel, copper, zinc, palladium, platinum, and gold; Y is an oxygen atom, a sulfur atom or a group of $=NR^{12}$; each of $R^{12}$, $R^{13}$ and $R^{14}$ independently is an alkyl group having 1 to 12 carbon atoms which may have one or more substituents, in which $R^{13}$ and $R^{14}$ may be connected to form a ring; $R^{15}$ is an alkyl group having 1 to 12 carbon atoms which may have one or more substituents, a phenyl or naphthyl group which may have one or more substituent groups; each of $R^{16}$ and $R^{17}$ independently is a hydrogen atom, a halogen atom, an alkyl group, an aryl group, a cyano group, an acyl group, an alkylsulfonyl group, or an arylsulfonyl group; and each of $R^{18}$, $R^{19}$ and $R^{20}$ independently is a hydrogen atom, an alkyl group, an aryl group, a hydroxyl group, an alkoxy group, an aryloxy group, an amino group, a carboxylic amide group, a sulfonamide group, a cyano group, a halogen atom, an acyl group, an alkylsulfonyl group, or an arylsulfonyl group.

18. The process of claim 1, wherein the organic dye is the oxonol dye having one of the following formulas:

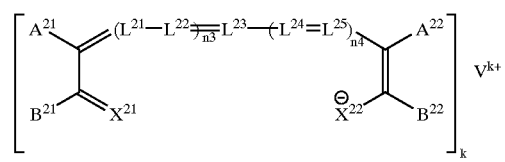

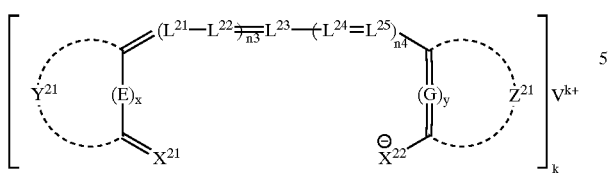

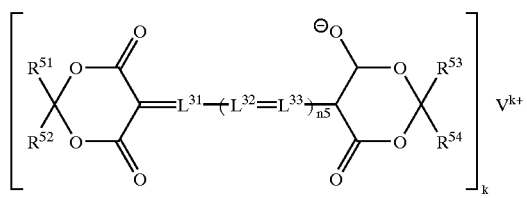

wherein each of $A^{21}$, $A^{22}$, $B^{21}$ and $B^{22}$ independently is a substituent group; each of $Y^{21}$ and $Z^{21}$ independently is an atomic group required for forming a carbocyclic or heterocyclic ring; each of E and G independently is an atomic group required for forming a conjugated double bond chain; $X^{21}$ is =O, =NR$^{21}$, or =C(CN)$_2$; $X^{22}$ is —O, —NR$^{21}$, or —C(CN)$_2$, in which $R^{21}$ is a substituent group; each of $L^{21}$, $L^{22}$, $L^{23}$, $L^{24}$ and $L^{25}$ independently is a methine group which may have one or more substituents; $V^{k+}$ is a cation; each of n3 and n4 independently is 0, 1 or 2; each of x and y independently is 0 or 1; and k is an integer of 1 to 10.

19. The process of claim 18, wherein the oxonol dye has the following formula:

wherein each of $R^{51}$, $R^{52}$, $R^{53}$ and $R^{54}$ independently is a hydrogen atom, an alkyl group, an aryl group, an aralkyl group, or a heterocyclic group, each group possibly having one or more substituents; each of $L^{31}$, $L^{32}$, and $L^{33}$ is a methine group which may have one or more substituents; n5 is 0, 1, 2, or 3; and $V^{k+}$ is a cation in which k is an integer of 1 to 10.

20. An optical information recording disc comprising a transparent substrate disc and a recording dye layer provided on the substrate disc, in which the recording dye layer is produced by coating on the substrate disc a dye solution of a laser-light sensitive organic dye dissolved in an organic solvent comprising 1,1,2,2,3,3,4-heptafluorocyclopentane and drying the coated dye solution, the laser-light sensitive organic dye being selected from the group consisting of a cyanine dye, an oxonol dye, and an azo dye.

* * * * *